(12) United States Patent
Wang

(10) Patent No.: US 10,955,702 B2
(45) Date of Patent: Mar. 23, 2021

(54) PHOTOLUMINESCENT NANOCRYSTALS BASED COLOR LIQUID CRYSTAL DISPLAY FOR SWITCHABLE TWO DIMENSIONAL/THREE DIMENSIONAL DISPLAYS WITH WIDER COLOR GAMUT AND HIGH ENERGY EFFICIENCY

(71) Applicant: SUZHOU XINGSHUO NANOTECH CO., LTD., Jiangsu (CN)

(72) Inventor: Yunjun Wang, Jiangsu (CN)

(73) Assignee: SUZHOU XINGSHUO NANOTECH CO., LTD., Jiangsu (CN)

( * ) Notice: Subject to any disclaimer, the term of this patent is extended or adjusted under 35 U.S.C. 154(b) by 0 days.

(21) Appl. No.: 16/479,223

(22) PCT Filed: Jan. 20, 2017

(86) PCT No.: PCT/CN2017/071885
§ 371 (c)(1),
(2) Date: Jul. 19, 2019

(87) PCT Pub. No.: WO2018/133024
PCT Pub. Date: Jul. 26, 2018

(65) Prior Publication Data
US 2020/0201123 A1   Jun. 25, 2020

(51) Int. Cl.
*G02F 1/13357*     (2006.01)
*G02B 30/23*       (2020.01)
(Continued)

(52) U.S. Cl.
CPC ....... *G02F 1/133617* (2013.01); *G02B 30/23* (2020.01); *G02B 30/25* (2020.01);
(Continued)

(58) Field of Classification Search
CPC ........ G02F 1/133606; G02F 1/133603; G02F 1/133536; G02F 2001/133607;
(Continued)

(56) References Cited

U.S. PATENT DOCUMENTS 10,018,871 B1 *   7/2018   Song ................. G02F 1/133512
10,329,409 B2 *   6/2019   Lee ........................... C08K 3/22
(Continued)

FOREIGN PATENT DOCUMENTS

CN        104145210 A     11/2014
CN        105044978 A     11/2015
(Continued)

*Primary Examiner* — Hoan C Nguyen
(74) *Attorney, Agent, or Firm* — Gang Yu

(57) ABSTRACT

A liquid crystal display (LCD) device containing a layer of patterned photoluminescent nanoparticles, which can emit highly saturated color lights when excited with backlights, is disclosed in this invention. The patterned photoluminescent nanoparticle layer is disposed between the backlight and the liquid crystal. The display device can improve the light utilization efficiency for 3 times thus saving reduce the backlight power consumption to ⅓ or being 3 times brighter at the same power consumption from conventional LCD displays. The display also can produce an ultra-wide color gamut up to 95% of the CIE 1976 color space or 165% of NTSC color gamut. The display is capable of switching between 2-dimensional and 3-dimensional viewing modes without any hardware structures changes applied.

14 Claims, 17 Drawing Sheets

(51) Int. Cl.
*G02B 30/25* (2020.01)
*G02F 1/1335* (2006.01)
*G02F 1/13363* (2006.01)

(52) U.S. Cl.
CPC .... *G02F 1/13363* (2013.01); *G02F 1/133528* (2013.01); *G02F 1/133638* (2021.01)

(58) Field of Classification Search
CPC ..... G02F 2001/133614; G02F 1/13363; G02F 1/133617; G02F 1/133528; G02F 1/133502; G02F 2001/133638; G02F 2001/133521; G02F 2001/133538; G02B 6/0053; G02B 6/0056; G02B 30/25; G02B 30/23
See application file for complete search history.

(56) References Cited

U.S. PATENT DOCUMENTS

| | | | | |
|---|---|---|---|---|
| 2004/0178975 | A1* | 9/2004 | Benedict | G03B 21/006 345/84 |
| 2006/0126156 | A1* | 6/2006 | Evans | G02F 1/13363 359/320 |
| 2007/0008617 | A1* | 1/2007 | Shestak | G02F 1/133526 359/455 |
| 2007/0177085 | A1 | 8/2007 | Nishiyama et al. | |
| 2012/0141689 | A1* | 6/2012 | Park | G02B 5/32 427/493 |
| 2012/0287381 | A1* | 11/2012 | Li | G02F 1/133617 349/106 |
| 2013/0070185 | A1* | 3/2013 | Hsiao | G02F 1/133634 349/96 |
| 2013/0169906 | A1* | 7/2013 | Nakanishi | G02F 1/133703 349/69 |
| 2014/0192294 | A1* | 7/2014 | Chen | G02F 1/133504 349/69 |
| 2015/0338705 | A1* | 11/2015 | Itou | G02F 1/133606 349/43 |
| 2016/0327714 | A1* | 11/2016 | Patrick | H01L 31/055 |
| 2017/0003438 | A1* | 1/2017 | Im | G02F 1/13362 |
| 2017/0329175 | A1* | 11/2017 | Lee | G02F 1/133514 |
| 2018/0203294 | A1* | 7/2018 | Chen | G02B 27/30 |

FOREIGN PATENT DOCUMENTS

| | | |
|---|---|---|
| CN | 105144275 A | 12/2015 |
| JP | 09258025 A * | 10/1997 |
| JP | 2007193272 A | 8/2007 |

* cited by examiner

Embodiment 1

Embodiment 1

Embodiment 49

Embodiment 61

Embodiment 73

Embodiment 73

Embodiment 109

Embodiment 109

PHOTOLUMINESCENT NANOCRYSTALS BASED COLOR LIQUID CRYSTAL DISPLAY FOR SWITCHABLE TWO DIMENSIONAL/THREE DIMENSIONAL DISPLAYS WITH WIDER COLOR GAMUT AND HIGH ENERGY EFFICIENCY

TECHNICAL FIELD

The present inventions relates to the field of color display, more specifically, flat panel display and colored liquid crystal displays (LCDs), which convert electrical signals into color images. In particular, the invention, photoluminescent (PL) nanocrystals are used to generated color light in response to excitation radiation from a backlight and the transmission of the color lights to viewers are controlled by the liquid crystals. Such displays are termed as photoluminescent nanocrystals-based color LCDs or (PLNC-LCDs).

BACKGROUND

In current color, transmissive LCD technology, the color display is implemented through three major components (FIG. 1) (a) backlight—white light source; (b) subpixel matrix of LC with controlling electrode matrix—white light transmission control (black and white control); and (c) subpixel matrix color filters—to filter lights in each subpixel and produce colors (color control). The subpixels in (b) and (c) are aligned in a one-to-one fashion.

The color gamut of a LCD is majorly decided by two factors: (a) spectral power distribution of color lights in the white backlight; and (b) the color filtering spectral powder distribution of color filters. The backlight itself has always defined the color temperature and the color space available. The ability of the color filters to produce high purity primary colors for individual subpixels determines the actual displayable color gamut of the LCD. Color filters are always not ideal to produce high color purity; thus, the LCD color gamut is always smaller than theoretical color gamut from the backlight. Current average LCD monitors using CCFL backlight can display about 70%-75% of NTSC color gamut (which is 54.2% of CIE 1976 color gamut).

Energy efficiency is another aspect of LCD to be improved yet. The evolution of backlight from CCFL to RGB-LEDs has greatly improved the energy efficiency for the backlight. However, the low energy efficiency, caused by color filters, has not been addressed yet. For color filters, the problem associates with their low light usage efficiency. Color filters absorb about 70%-75% of the lights from the LC layer, thus result to only 25%-30% of light usage efficiency in the color filter layer. This means that there is still plenty room for improving the light usage efficiency and the energy efficiency for LCDs.

The third aspect of LCD which can be further improved is the brightness. Current LCD monitors typically has brightness in about 150-300 $cd/m^2$. For high dynamic range displays, outdoor displays, and larger screen displays, brighter LCDs are needed. This can be improved by increasing the brightness of the backlight. However, considering that the overall light usage efficiency for current LCDs is only 5-10%, meaning that a 3000 $cd/m^2$ backlight can produce LCD with only 150-300 $cd/m^2$ brightness to viewers, that strategy is not efficient in energy. Moreover, much more heat will be produced for the white light as well as in the color filters. Heat dissipation will be an additional hurdle especially for larger screen displays.

Aiming to improve these three important performance specifications for LCDs, alternative approaches, without the use of color filters. In such color-filter-free LCDs, individual primary colors are produced by fluorescence or phosphorescence phenomenon. An emitting layer composed of organic dyes or phosphors can absorb UV or blue lights and emit blue, green, or red lights. When these dyes or phosphors are patterned as subpixels, individual primary colors can be produced for each subpixel. The light exiting is still be controlled by LC modules. These new designs can be referred as PL color LCDs. They can result to a large improvement in light usage efficiency and energy efficiency.

The loss of polarization information in the emitted lights for QDs-based photoluminescent LCDs as disclosed in the above two patents may prevent direct applications of such displays from stereoscopic 3D displays. Stereoscopic display refers to the technique for creating 3D visual perception for viewers by presenting two offset images separately to the left and right eye of the viewer. The human brain can combine both 2D offset images to give the perception of 3D depth. One way to achieve stereoscopic display is by creating two differently polarized views, which are viewed correctly by left and right eyes when the observe wears a pair of analyzing polarized glasses (FIG. 2). For conventional LCDs, the output light is polarized, and suitable for stereoscopic 3D display. For the two photoluminescent LCDs as disclosed in U.S. Pat. No. 2009/0230412A1 and U.S. Pat. No. 2009/0091689A1, such polarization information is not present in the photoluminescent lights from QDs. This may limit these new photoluminescent LCDs for stereoscopic 3D displays.

SUMMARY OF THE INVENTION

Embodiments of the present invention are directed to ultra wide color gamut, high energy conversion efficiency, high brightness, and low cost color LCDs with 2D/3D switchable modes.

In 2D mode, a LCD in accordance with the invention enables images and videos being viewed with: (1) a spectacular, vivid range of colors—up to 90% of CIE 1976 color space (equivalent to 170% of NTSC color space); (2) high energy efficiency—up to 3 times higher than average LCDs embedded with color filters; and (3) high brightness—up to 3 times higher than current LCDs. Exploiting the inherent polarization property of lights from LCD displays, the present invention also enable stereoscopic 3D LCD displays.

In 3D viewing mode, the display enables superior 3D display performances of: (1) high resolution—identical resolution in 3D mode as in 2D mode; (2) ultra-wider color gamut—identical color gamut as in 2D modes; (3) high brightness—much less light loss than current 3D displays; (4) wide viewing angle—same as current LCDs; (5) energy saving—identical to 2D mode at the same refresh rate and the same power consumption; (6) simultaneous viewing—left eye and right eye of a viewer see images simultaneously; (7) balanced color viewing—both eyes of a viewer perceive color images; (8) free of image "ghosting"; (9) easy 2D/3D switching—simply clicking on one button.

Such new LCDs have applications in a variety of flat panel display electronics devices including, but not limited to, theater screens, 3D televisions, monitors, computer monitors, cell phones, personal digital assistant (PDA), view screen of satellite navigation systems, commercial show screens, etc.

The new display technology in this invention includes two display systems: (1) photoluminescent nanocrystals based 2D color LCD (PLNC-2D-LCD), and (2) photoluminescent nanocrystals based 2D/3D switchable color LCD (PLNC-2D/3D-LCD).

In PLNC-2D-LCD, a display system comprises of three major components: (1) a radiation source, (2) a light conversion panel layer which has photoluminescent nanocrystals (PLNCs) embedded in subpixels, and (3) a LC module layer with a matrix of electrodes for defining subpixels and modulating light transmission in the LC subpixels. FIG. 3 illustrates such a display system, with three primary colors of red, green, and violet. The light conversion panel layer 20 is positioned between the radiation source and the LC module layer, thus enabling lights from the backlight source to excite PLNCs in each subpixel and emit individual primary color lights which further propagate into LC layer and modulated as polarized lights before exiting to viewers. The subpixels in the light conversion panel layer and the LC module layer are fitted in a one-to-one fashion.

The radiation source may be UV-blue light radiation sources (FIG. 3) which can excite semiconductor nanocrystals to emit visible lights through a down-conversion process. These sources can be a UV-emitting semiconductor LED with a monochromatic excitation wavelength ranging from about 350 nm to 400 nm, or a violet-emitting semiconductor LED with a monochromatic excitation wavelength at about 400-450 nm, or a blue-emitting emitting LED with a peak excitation wavelength at 450-480 nm. The radiation source can also comprise an UV emission line generated by a mercury (Hg) plasma discharge (peak at 254 nm). (In the present invention, colors are classified according to the wavelength of lights and defined as following: UV—200-400 nm, violet (V)—400-450 nm; B (blue)—450-480 nm, cyan (C)—480-520 nm, green (G)—520-570 nm, yellow (Y)—570-590 nm, red (R)—590-700 nm, and near-infrared (NIR)—700-1400 nm.)

The light conversion panel layer is positioned in front of the radiation source layer. This layer replaces the color filter layer in conventional LCDs. FIG. 3 sketches the light pathway and color generation in one pixel of a 2-D color LCD display with an UV backlight source (for illustration only and not limiting the structure of displays in the present invention). The light conversion panel layer 20 is in fact comprised by four layers of: the UV dichroic coating layer; the patterned color subpixel layer; and the visible dichroic coating layer. These layers are laid on a transparent substrate support layer positioned on either side of the light conversion layer. The two dichroic layers are optically designed to improve the light utilization efficiency. The UV dichroic coating passes UV lights from the backlight source into the color subpixel layer, but reflect (with partial absorption) emitted visible lights from the color subpixel layer back to the color subpixel layer (FIG. 4A). The Visible dichroic coating layer passes visible light through but reflects UV lights back to the color subpixel layer (FIG. 4B).

Depending on their chemical composition, doping element, and size, these nanocrystals can emit various colors in the full visible spectral range. Each color subpixel forms a primary color and a number of subpixels can form one pixel. Thus each pixel contains multiple primary colors. The number of primary colors for each pixel, and thus the LCD display in the present invention, can be three colors, four colors, five colors, or even six colors, along with increases in the color gamut for resulting LCDs. FIG. 3 sketches a display with three primary colors in one pixel. Three kinds of PLNCs are used to generate R, G, and V lights in the each designated subpixel area of the pixel. Specifically, red subpixel filled with red-emitting nanocrystals is responsible for red color generation; green subpixel filled with green-emitting nanocrystals is responsible for green color generation; and violet subpixel filled with violet-emitting nanocrystals is responsible for violet color generation, respectively.

The liquid crystal module layer (FIG. 3) is positioned in front of the light conversion plane layer. This layer concludes multiple sub-layers of: (1) first polarizer layer, which is a linear polarizer filter layer used to filter colored and unpolarized lights from the light conversion layer and generate linearly polarized lights. (2) liquid crystal layer (combined with two support layers, multiple electrode layers including driver TFT electrode layer and common electrode layer and spacer layers, not shown in FIG. 3). (3) second polarizer layer, with a polarization angle 90° to that in the first polarizer layer. The polarization direction of the first polarizer layer and the polarization direction of the second polarizer layer are in the same plane, but are orthogonal to each other. The intensity of lights exiting from the second polarizer layer is controlled by the rotation degree of its polarization angle after passing through the liquid crystal layer, thus enabling bright state/dark state control. The TFT electrodes are patterned with same size, dimension, vertical and horizontal alignments to that of colored subpixel in the patterned color subpixel layer.

During operation of PLNC-2D-LCD, backlight source excites individual subpixels to emit color lights, and form R, G, V (or more primary colors) subpixel patterns. Lights continue to a first linear polarizer layer having a polarization direction angle of 0° or 45° and colored and linearly polarized lights can be produced. After the liquid crystal layer, lights pass a second linear polarizer layer and exiting with a polarization direction angle of 90° or 135°. Exited lights, after passing through an anti-reflection layer, can be viewed. The color and the intensity of lights exiting from each subpixel can be manipulated. Thus, color pictures or videos can be displayed.

It is the object of this PLNC-2D-LCD to provide ultra-wide color gamut, high energy efficiency, and high brightness to viewers. The PLNC-2D-LCD can produce a color gamut as larger as of 90% of CIE 1976 color space (or 163% of NTSC color gamut). This is due to the high color saturation of emissions from PLNCs. As a result, highly saturated color lights, in the entire visible spectral range, can be produced without color filters. Two examples are shown in FIG. 5. The photoluminescence emission spectra from ZnSe/ZnSeS/ZnS nanocrystals are peaked at 430 nm and 440 nm, with an ultra narrow emission line width. The full-width-at-half-maximum, FWHM, is 10.6 nm and 10.8 nm, respectively. Multi-primary colors as formed can produce an exceptionally wide color gamut in LCDs. For example, using highly saturated R, G, and V produced from PLNCs as the three primary colors (FIG. 6), a color gamut as large as of 150% of that of NTSC can be generated.

In 2D/3D switchable stereoscopic PLNC-2D/3D-LCD, the configuration is based on PLNC-2D-LCD but with modifications to light polarization arrangements. 3D display is fulfilled by combining the principles of LCD display, stereoscopic 3D display, analglyph 3D display, and also polarized glasses in one system. FIG. 7, FIG. 8 and FIG. 9 depict the light pathway and polarization manipulation schemes in a three-primary-color PLNC-2D/3D-LCD. The color and brightness control for each subpixel is the same as in PLNC-2D-LCD. However, a ½ phase patterned retarder layer is added in the position between the second linear polarizer layer and the anti-reflection layer (FIG. 7).

The light pathway in a PLNC-2D/3D-LCD can be illustrated in FIG. 8. The unpolarized UV excitation lights reach the front patterned color subpixel layer and excite photoluminescent nanocrsytals to emit colored R, G, and V lights, respectively for R, G, and B subpixels. Colored lights as generated continue to pass the front first linear polarizer, the first linear polarizer layer, which has an in-plane polarization direction angle of 45° to the horizontal direction, and become linearly polarized. In front, a liquid crystal layer is placed to rotate the polarization direction angle of lights from the first linear polarizer layer. In front of the liquid crystal layer is the second linear polarizer, the second linear polarizer layer, which has the polarization direction angle in normal (135°) to that of the first linear polarizer layer. In front of the second polarizer layer is the ½ patterned phase retarded layer. The axis of the ½ phase retarder is in normal to the horizontal axis in plane, thus forming a −45° angle to the polarization direction angle of the second linear polarizer layer. The ½ phase retarder pattern also has the pattern (dimension and alignment) only to green subpixels, but sparing red and violet subpixels from phase retardation. Thus, this layer rotates the 135° polarized green lights, originating from green subpixel, for 90° but has no effects on lights from red and violet subpixels. Green lights become 45° linearly polarized, but red and violet lights are kept at 135° polarized. When the viewer in front of the LCD does not wear a pair of analyzer glasses, both eyes of the viewer will have the same color image perceived, as human vision system cannot differentiate lights at different polarization direction. In this case, the display is operated at 2D mode.

When the viewer wears a pair of linearly polarized glasses (polarized 3D glasses), the two eyes of the viewer will perceive different images (FIG. 8). The glasses is designed in a way that the left eye glass and right eye glass have polarization direction of angles for 135° and 45°, respectively. Thus, the left eye glass only let the violet and red lights, which have the same polarization direction, to pass through and be perceived by the left eye. The left eye is thus able to see purple color images (red plus violet=purple). The right eye glass only let the green lights to pass through and be perceived by the right eye. The right eye then sees green images. This anaglyph phenomenon can enable the 3D display similar to anaglyph 3D display. However, instead of using color filters to produce different color images for the left eye and the right eye, in the present invention the linearly polarized glasses is used taking advantages from the polarization procedure in LCDs. In this case, the display is operated at 3D mode.

FIG. 9 sketches the display of 3D images in a PLNC-2D/3D-LCD in a 3D mode. Two frames of pictures, one to deliver to the left eye and the other to the right eye, are processed in a way that the left picture is in red and violet color and the right picture is in green color. The left eye image (magenta color) is displayed through the red and violet subpixels, and the right eye green image is display through green subpixels. By manipulating the polarization direction of the two output images, as described in the above paragraph, the viewer can simultaneously perceive left eye image and right eye image for left eye and right eye, respectively. Depth information can be perceived by the human vision system after comparing and processing the two perceived images. The correct color information can also be perceived by combining the two color images. As a result, 3D images and videos or other media can be displayed to the viewer.

It is the object to achieve important improvements in performance, energy saving, and cost reduction for PLNC-2D/3D-LCD than conventional 3D LCDs. In terms of performance, the 3D display has the identical ultra-wide color gamut to that of PLNC-2D-LCD, reaching up to over 160% of NTSC color space.

BRIEF DESCRIPTION OF THE DRAWINGS

The above and other advantages will become readily apparent by reference to the following detailed description when considered in conjunction with the accompanying drawings wherein.

DETAILED DESCRIPTION OF THE EMBODIMENTS

Figure 10:
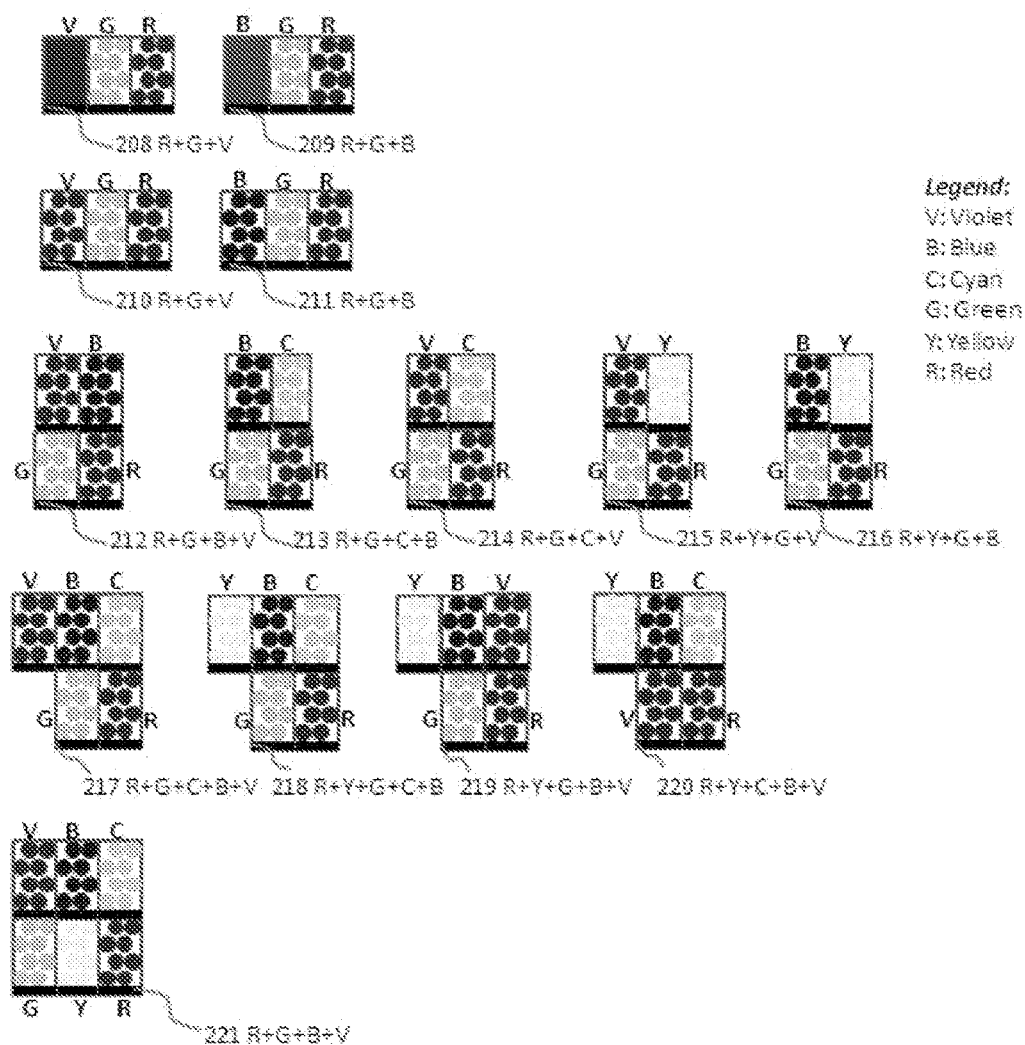
FIG. 10. PLNCs subpixel combinations in one image pixel, for 3-primary color, 4-primary color, 5-primary color, and six-primary color displays.
Figure 11:
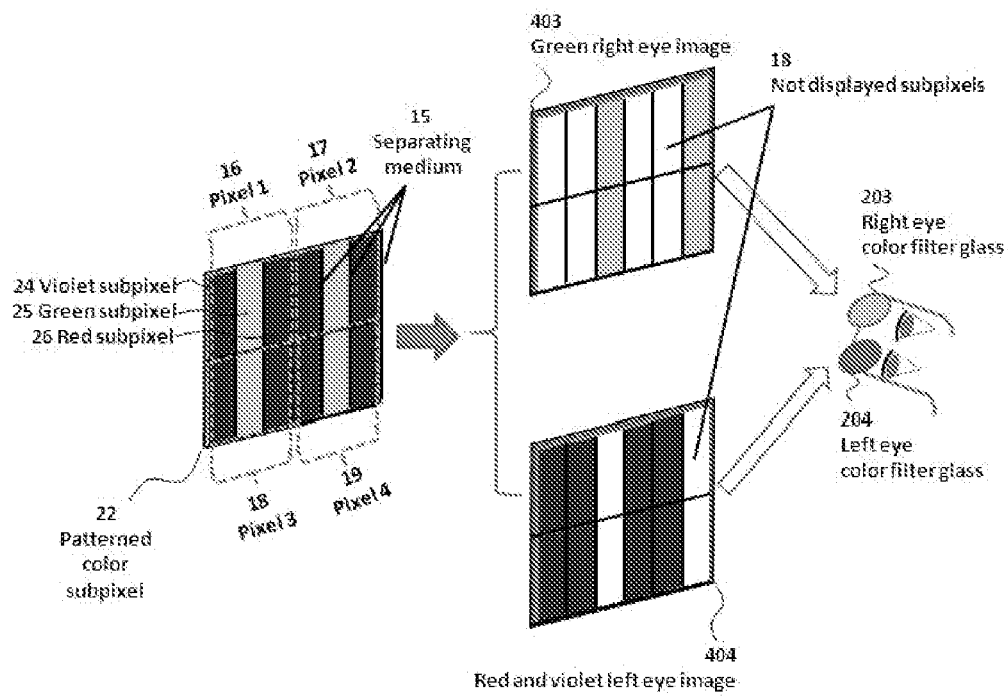
FIG. 11. 3D display illustration for PLNC-2D/3D-LCDs using color filter based analyzer glasses.

Phosphorescent nanocrystals (PLNCs) used in the light conversion layer are nanometer sized nanocrystals or nanoparticles. These nanocrystals have sizes in the range of about 1 nm to 100 nm. Under an excitation source, they can absorb the photons and emit visible photons. In the present invention, the following classes of PLNCs are included:

(1) Nanocrystals structurally composed of semiconductor materials, such as core/shell structure ZnSe/ZnS nanocrystals (FIG. 10) and core/shell structure CdSe/ZnS nanoparticles (FIG. 11). Their peak emission wavelength depends on their size, due to the quantum confining effect, thus they can also referred as quantum dots (QDs). QDs may comprises a material or mixed materials selected from the groups consisting group II-VI compounds, group III-V compounds, group IV-VI compounds, or group I-VI compounds and their alloys. QDs can comprise one or two or three kinds of above compounds in their composition, especially for core/shell structure QDs.

(2) Chemically-doped semiconductor nanocrystals, or doped quantum dots (d-QDs). These d-QDs are comprised by host QDs and doped elements in the crystal structure of host QDs. These d-QDs can have semiconductor shell coating to form core/shell structure d-QDs. Shell coating materials can be materials as listed in above paragraph.

(3) Rare-earth elements doped upconverting nanoparticles (UCNPs). The doping concentration and relative ratio of doping elements can be tuned to produce desired visible emission spectra. UCNPs after doping can also have the core/shell structure to render improved stability and emission efficiency.

PLNCs have tunable emissions in the entire visible range, enabling a great versatility in the choice of primary colors for displays. PLNCs also have narrow single-peak photoluminescence spectra, producing highly saturated primary color for displays. For QDs and d-QDs, they have continuous absorption spectra, enabling that a single UV or violet light source can excite all the kinds of QDs or d-QDs simultaneously. For UCNPs, they have even narrow emission spectra, with FWHM as narrow as 10-20 nm. Different UCNPs, can also be excited with a single near-infrared light source to emit visible lights. These inherent optical properties enable simple backlight design and choice of versatile primary colors for displays.

PLNCs have high photostability, which is 10-100 s times better than organic dyes. This ensures that the color and brightness of resulting display to be stable, thus a long lifetime for the display.

PLNCs can also be surface modified or treated through manipulating their surface ligands chemistry. This enables facial polarity and charge control on the surface PLNCs, enabling the facial processing of PLNCs for the form either in solution, in a solid film, or embedded in a supporting polymeric matrix.

PLNCs from the above three classes can produce highly saturated colors in the entire visible range, which can be used as primary colors in LCD displays. The chromaticity values of a number of colors produced from PLNCs are presented in FIG. 15. This figure is exemplary but not exhaustive for the number of colors PLNCs can produce or the structure of PLNCs can be used.

For LCD displays in this invention, the patterned color subpixel layer can be realized by patterning PLNCs in subpixels. When excited by the backlight, each subpixel can emit a primary color, depending on the kind of PLNCs embedded in the subpixel. One image pixel is composed by a number of color subpixels, e.g. three color subpixels of R, G, and V.

The number of subpixels in one image pixel is the same as the number of primary colors used in the display system. In a full color display, three or more primary colors can be used. In the present invention, three, four, five, or six primary colors can be used in displays. Thus, for each image pixel, a number of PLNCs subpixel combinations can be used in PLNC-2D-LCD or PLNC-2D/3D-LCD (FIG. 10):

(1) Two PLNCs display: R+G, plus a violet or blue backlight source which is used for both blue primary color subpixel and also the excitation source for R and G PLNCs.

(2) Three PLNCs display: R+G+B, or R+G+V.

(3) Four PLNCs display: R+G+B+V, or R+G+C+B, or R+G+C+V, or R+Y+G+B, or R+Y+G+V;

(4) Five PLNCs display: R+G+C+B+V, or R+Y+G+C+B, or R+Y+G+C+V, or R+Y+G+B+V;

(5) Six PLNCs display: R+Y+G+C+B+V.

The spatial arrangement of color subpixels in each image pixel can be varied. For example, in a three-primary color display PLNC-2D-LCD, the three R, G, and V subpixels can be arranged as G in the middle of R and V; or V in the middle of R and G. Arrangements of color subpixels in other PLNC-2D-LCD and PLNC-2D/3D-LCD displays with different primary colors can also be patterned and varied similarly.

Figure 1:
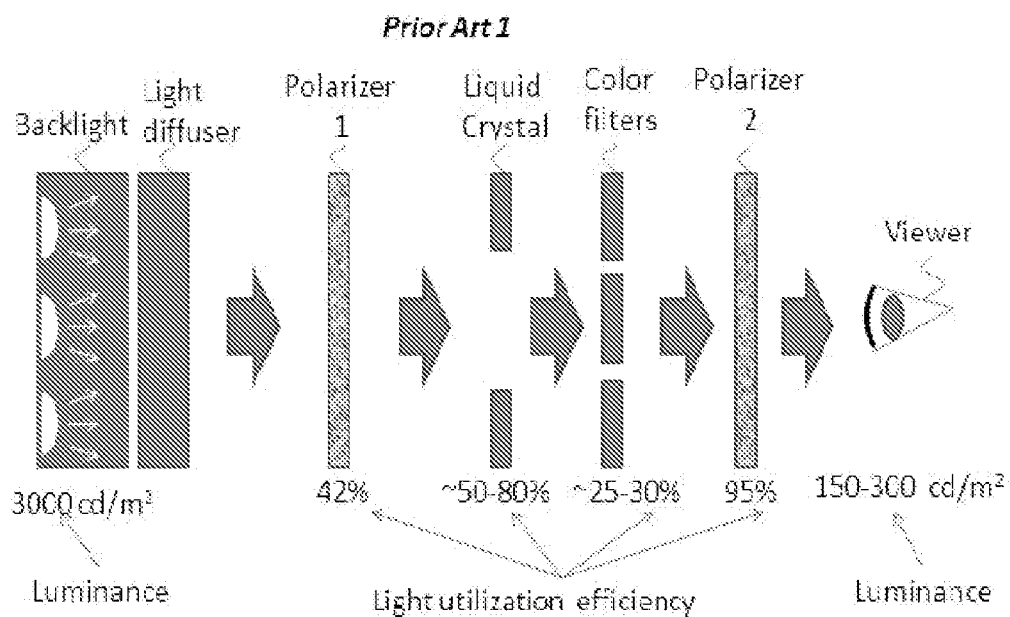
FIG. 1. Structure and transmission of various components in an active matrix liquid crystal display resulting in 5-10% overall transmission.
Figure 2:
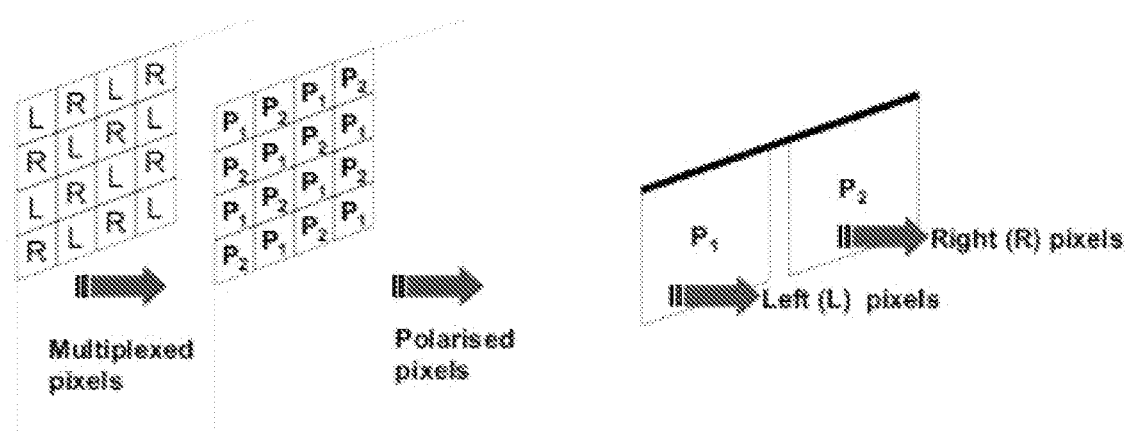
FIG. 2. The micro-polarizer stereoscopic display principle. A spatially multiplexed image (left) with left (L) and right (R) image pixels is placed behind a patterned micro-polarizer element (middle). When viewed with polarized glasses the P1 polarized pixels are seen only in the left eye and P2 polarized in the right.
Figure 3:
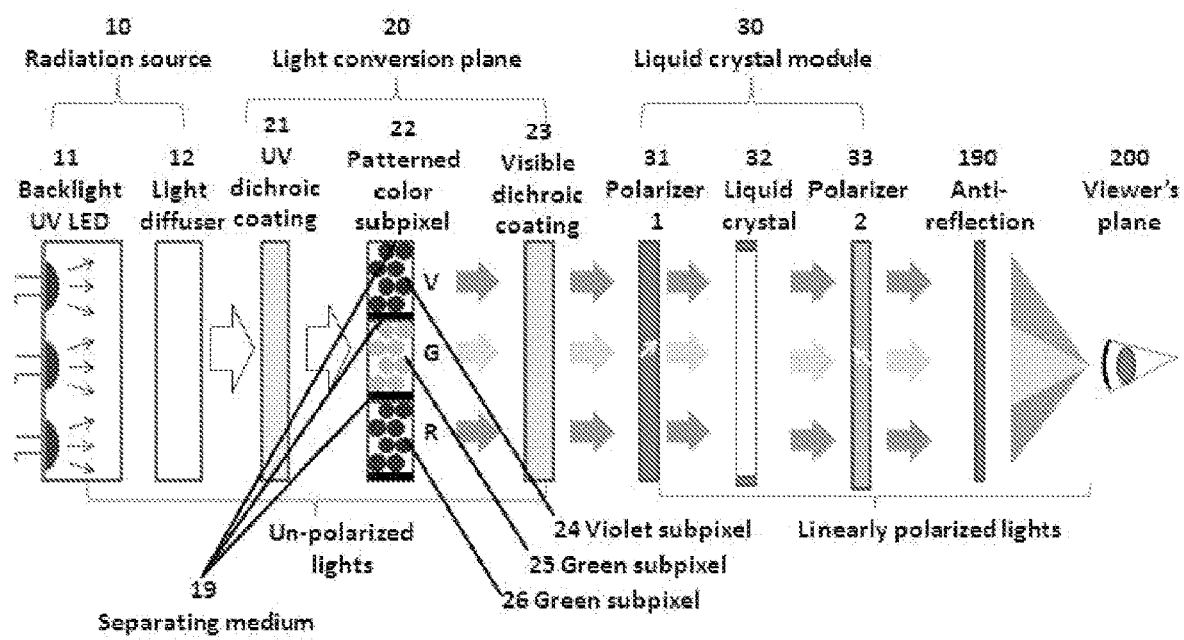
FIG. 3. Design of a PLNC-2D-LCD with three primary color subpixels of red, green, and violet.
Figure 4A:
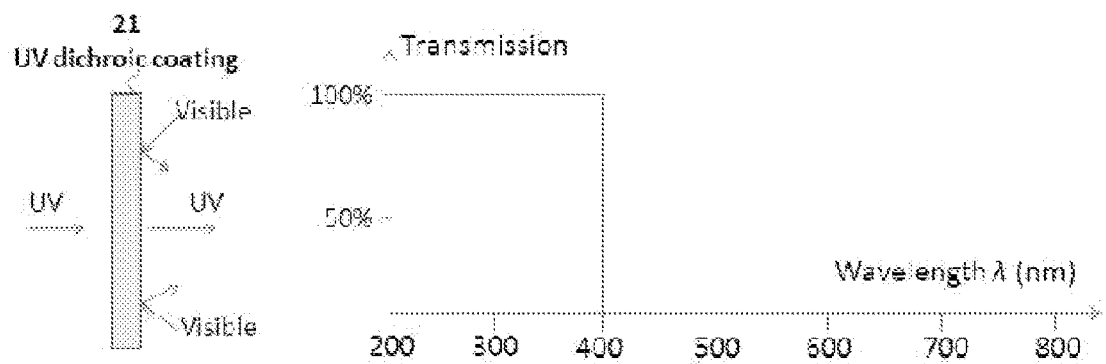
FIG. 4A. UV dichroic coating layer: transmission of UV lights and reflection of visible light, and ideal transmission spectrum.
Figure 4B:
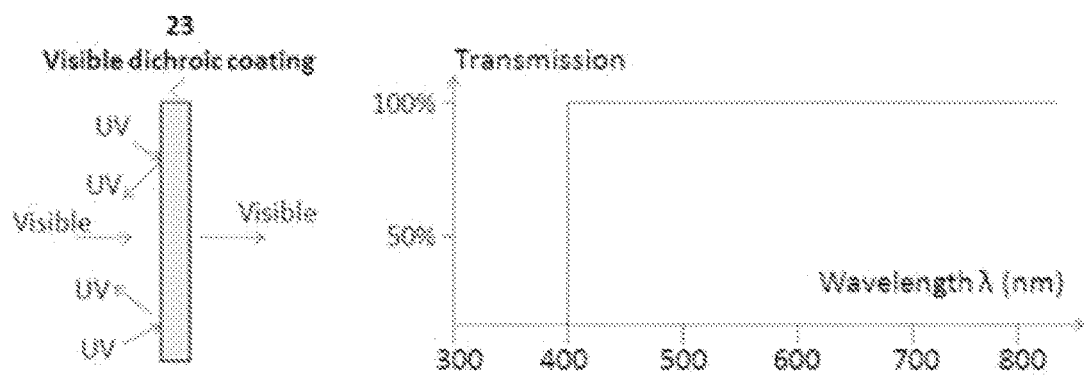
FIG. 4B Visible dichroic coating layer: transmission of visible lights and reflection of UV lights, and ideal transmission spectrum.
Figure 5:
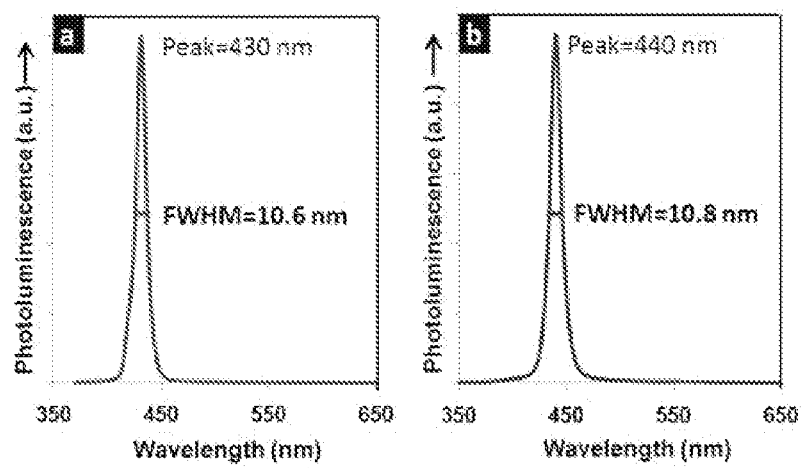
FIG. 5. Photoluminescent emission spectra of two core/shell/shell structured ZnSe/ZnSeS/ZnS PLNCs at different shell coating thickness, excited at 340 nm.
Figure 6:
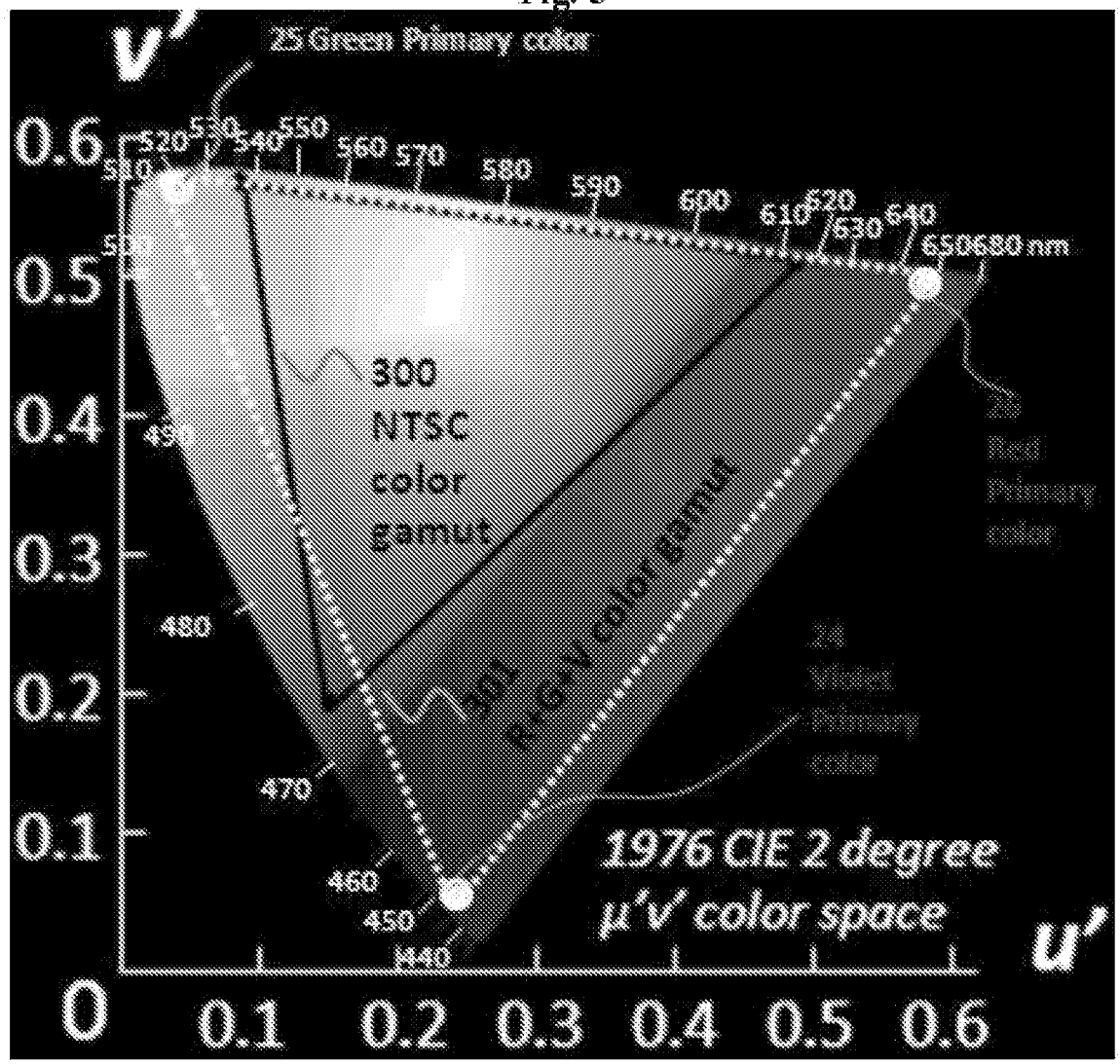
FIG. 6. Color gamut of a display with highly saturated red, green, and violet primary colors in a PLNS-2D-LCD or PLNS-2D/3D-LCD, with comparison to NTSC.
Figure 7:
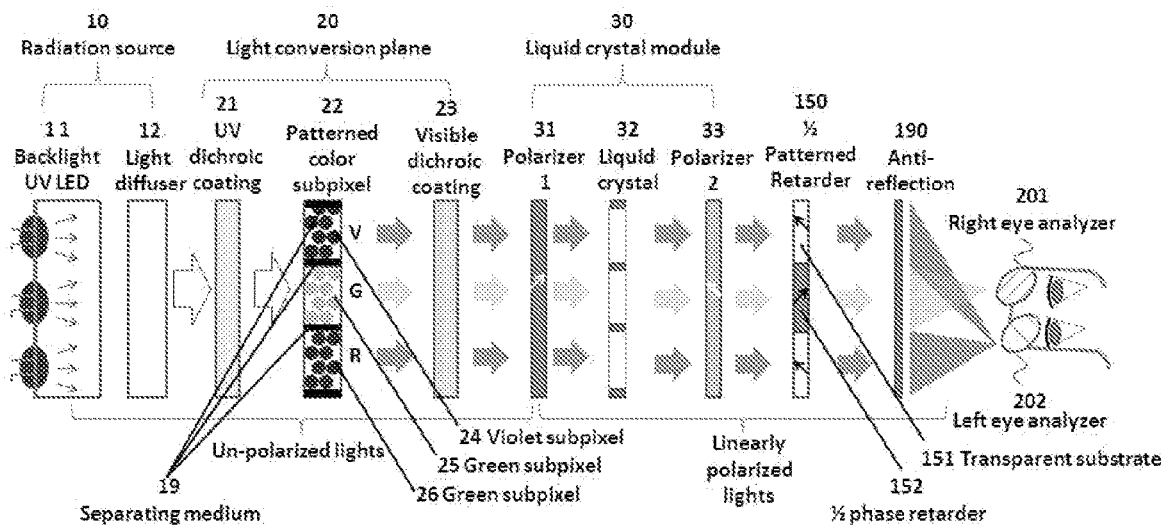
FIG. 7. Layer-by-layer design of a PLNC-2D/3D-LCD with three primary color subpixels of red, green, and violet, operated at 3D viewing mode.

By tuning the kind of color and the number of PLNCs subpixels, it is the object of this invention to have ultra-wide color gamut for PLNC-2D-LCD and PLNC-2D/3D-LCD. Taking advantages from the ultra color saturation and color tunability, color gamut is estimated to reach as large as 170% of NTSC color gamut (equivalent to 90% of CIE 1976 color space). Specifically, color gamuts of displays in this invention with different primary color combinations are illustrated in FIG. 6, and FIG. 17 to FIG. 24 (for down converting PLNCs based displays), and FIG. 25 (for upconverting PLNCs based displays):

FIG. 6 shows the R+G+V color gamut 301 can reach about 150% of NTSC color gamut 300. The color of V can either be from backlight violet light or from violet PLNCs.

3D display for LCDs in this invention can be realized by three different mechanisms: active shutter glasses, passive polarized glasses, and color filter glasses.

First, the PLNC-2D-LCD is compatible for 3D display with active shutter polarizer glasses. In this mode, the viewer can wears a pair of glasses which contains liquid crystal and controlling electronics. The left-eye and right eye images can be displayed to left-eye and right-eye of the viewer in a sequential manner, by block lights to each eye intermittently. In each time, one of the two eyes sees a complete color image, but the other eye sees no image at all. The switching frequency of the active shutter polarizer is synchronized with the image refresh rate of PLNC-2D-LCD. Full resolution of 2D can be achieved also in 3D mode, but the refresh rate of the LCD has to be increased to twice of that in 2D mode.

The other two ways to display 3D images or videos from PLNC-2D/3D-LCD in this invention will be based on anaglyph, which relies on simultaneously displaying two differently colored images to the left eye and the right eye respectively. In these two ways, left-image and right eye image are displayed on the screen simultaneously. The 3D imaging can be achieved through: the color subpixels on PLNC-2D/3D-LCD are divided into left-eye subpixel(s) and right-eye subpixel(s). Left-eye subpixel(s) are used to display the left eye image, and right-eye subpixel(s) are used to display the right eye image. Lights from left-eye subpixel(s) are manipulated to be delivered only to the left eye of the viewer, and lights from right-eye subpixel(s) will be delivered only to the right eye of the viewer. This manipulation can be realized either through passive polarization glasses or color filter, glasses.

Figure 8:
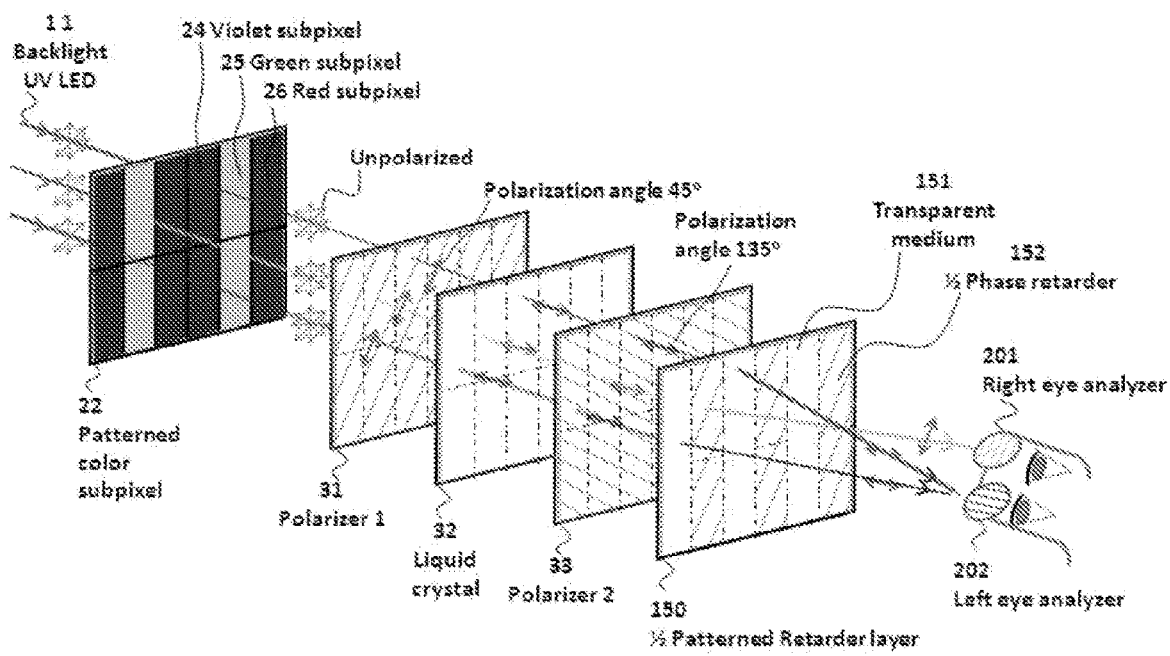
FIG. 8. Color and polarization manipulation for 3D display in a PLNC-2D/3D-LCD.
Figure 9:
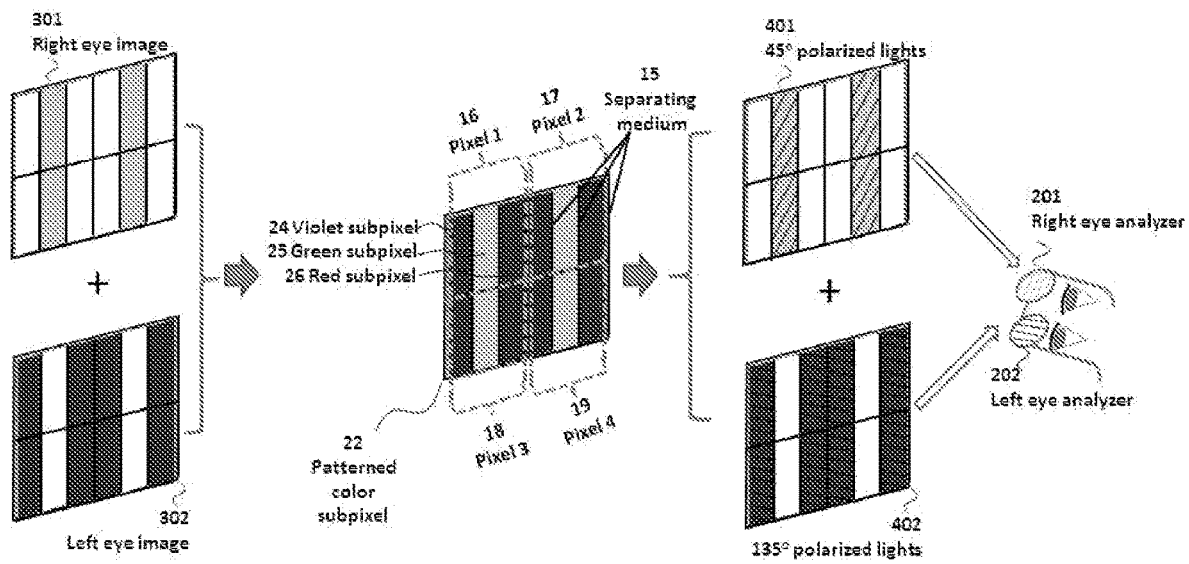
FIG. 9. The principle of stereoscopic 3D display fulfilled by controlling the polarization of left color image and right color image for a PLNC-2D/3D-LCD.

The 3D display for PLNC-2D/3D-LCD using passive polarized glasses can be realized by differently polarizing the left-eye image and right-eye image. FIG. 8 and FIG. 9 sketches such a principle for displaying a 3D image with a PLNC-2D/3D-LCD. The display uses three PLNCs in the patterned color subpixel layer to produce R, G, and V three primary colors in the three R, G, and V subpixels respectively. Light transmission for each subpixel is attenuated through sequentially passing through front layers of the first linear polarizer 31, a liquid crystal layer 32, and the second linear polarizer 33, where linear the first linear polarizer 31 and the second linear polarizer 33 have normal polarization direction of angle in the polarizer layer plane (45° and 135°, respectively). A ½ patterned phase retarder layer 150 is fabricated in a thickness that optimized for incident linearly-polarized green lights to have a 90° rotation of the polarization angle, when the phase retarder layer 150 is aligned in a way that the ½ phase retarder 152 is superimposed only on green subpixel 25 and its optical axis is in a angle of 45° to the polarization direction of incident green lights. The ½ phase retarder layer 150 does not change the polarization direction of lights from violet subpixel 24 and red subpixel 26. As a result, green lights change polarization direction from 135° to 45°, while violet and red lights still have the polarization angle of 135°. For a 3D image to be displayed, the source image should comprise two sub-images (FIG. 9), left eye image 302 in violet and red color, and right eye image 301 in green color. The left eye image 302 is displayed by violet subpixel 24 and red subpixel 26. The right eye image 301 is displayed by green subpixel 25. Both images are displayed simultaneously. After lights exiting from the ½ phase retarder layer 150, violet and red lights displaying left eye image 302 become 1350 polarized lights 402, while green lights displaying the right eye image 301 become 45° polarized lights 401. In front of the display screen, the viewer wears a pair of orthogonally linearly polarized glasses to see the 3D image. The left analyzer glass 202 has a linear polarization angle of 135° and the right eye analyzer glass 201 has a linear polarization angle of 45°. Thus, the left eye analyzer 202 only let 135° polarized lights 402 to enter into the left eye, and the right eye analyzer 201 only let 45° polarized lights 401 to enter into the right eye. The vision system of the viewer combines both the left eye image 301 from left eye and right eye 302 from right eye, and perceives the color and depth information of the image nearly instantly.

The 3D display for PLNC-2D/3D-LCD using color filter glasses can also be realized. In this case, the ½ phase retarder layer is not used and the PLNCs-2D/3D-LCD is the same as PLNCs-2D-LCD. In operation, both left-eye and right eye images are displayed on screen, with different colors. The viewer wears a pair of glasses with color filters in both glasses but filtering different visible spectral bands. The left glass has color filters to only let color lights from left-eye subpixel(s) to pass through and viewed by left eye. The right glass has color filters to only let color lights from right eye subpixel(s) to pass through and viewed by right eye. FIG. 11 shows the principle of color-filter based anaglyph 3D display in a PLNCs-2D/3D-LCD. The display has three PLNCs to produce R, G, and V primary colors. R subpixels 26 and V subpixels 24 are used to display red and violet left-eye image 404, while G subpixels 25 are used to display green right-eye image 403. The left eye color filter glass 204 absorbs G color but let R and V colors to pass through, thus left eye sees left eye image 404. The right eye color filter glass 203 absorbs both R and V colors but let G lights to pass through, thus right eye sees the right eye image 403. Due to the narrow emissions of PLNCs, color filters can be manufacture to have minimal light leakage for both eyes, reducing the "ghost" phenomenon commonly occurring in color anaglyph displays.

For 3D displays using passive polarization glasses or color filter glasses, beyond the example discussed above using R, G, and V three color patterning, a variety of other left-eye and right-eye subpixel patterns can be used in PLNCs-2D/3D-LCD. Color subpixels in PLNC-2D/3D-LCD are summarized in Table 1 through Table 4. Each color display mode represents the number and color of PLNCs used in its corresponding PLNC-2D/3D-LCD. The left eye subpixel(s) represents the number and color of subpixels whose lights will be delivered to the left eye of the viewer. The right eye subpixel(s) represents the number and color of subpixels whose lights will be delivered to the right eye of the viewer. Table 1 lists out the possible left-eye and right eye patterns of color subpixels in 3-primary color based PLNC-2D/3D-LCD in this invention. Table 2 lists out the possible left-eye and right eye patterns of color subpixels in 4-primary color PLNCs based PLNC-2D/3D-LCD in this invention. Table 3 lists out the possible left-eye and right eye patterns of color subpixels in 5-primary color PLNCs based PLNC-2D/3D-LCD in this invention. Table 4 lists out the possible left-eye and right eye patterns of color subpixels in 6-primary color PLNCs based PLNC-2D/3D-LCD in this invention. For each pattern: PLNCs-2D/3D-LCD using passive polarized glasses, either the left eye subpixel(s) or the right eye subpixel(s) are mounted with a ½ phase retarder, but not both; PLNCs-2D/3D-LCD using color filter glasses, the left eye glass filter lights from right eye subpixel(s), while the right eye glass filter lights from left eye subpixel(s).

TABLE 1

Color patterning manner of PLNCs-comprised subpixels for 3D display (3-primary colors)

| Color display mode | Left eye subpixel(s) | Right eye subpixel(s) |
|---|---|---|
| R + G + V | R + V | G |
| | R + G | V |
| | V + G | R |
| R + G + B | R + B | G |
| | R + G | B |
| | B + G | R |

TABLE 2

Color patterning manner of PLNCs-comprised subpixels for 3D display (4-primary colors)

| Color display mode | Left eye subpixel(s) | Right eye subpixel(s) |
|---|---|---|
| R + G + B + V | R | G + B + V |
| | G | R + B + V |
| | B | R + G + V |
| | V | R + G + B |
| | R + V | G + B |
| | R + B | G + V |
| | R + G | B + V |
| R + G + C + B | R | G + C + B |
| | G | R + B + V |
| | B | R + G + V |
| | C | R + G + B |
| | R + B | G + C |
| | R + C | G + B |
| | R + G | C + B |
| R + G + C + V | R | G + C + B |
| | G | R + B + V |
| | C | R + G + V |
| | V | R + G + C |
| | R + V | G + C |
| | R + C | G + V |
| | R + G | C + V |
| R + Y + G + B | R | Y + G + B |
| | Y | R + G + B |
| | G | R + Y + B |
| | B | R + Y + G |
| | R + B | Y + G |
| | R + G | Y + B |
| | R + Y | G + B |
| R + Y + G + V | R | Y + G + B |
| | Y | R + G + B |
| | G | R + Y + B |
| | V | R + Y + G |
| | R + V | Y + G |
| | R + G | Y + V |
| | R + Y | G + V |

TABLE 3

Color patterning manner of PLNCs-comprised subpixels for 3D display (5-primary colors)

| Color display mode | Left eye subpixel(s) | Right eye subpixel(s) |
|---|---|---|
| R + G + C + B + V | R | Y + G + B |
| | G | C + B + V |
| | C | R + G + B + V |
| | B | R + G + C + V |
| | V | R + G + C + G |
| | R + V | G + C + B |
| | R + B | G + C + V |
| | R + C | G + B + V |
| | R + G | C + B + V |
| | G + V | R + C + B |
| | G + B | R + C + V |
| | G + C | R + B + V |
| | C + V | R + G + B |

TABLE 3-continued

Color patterning manner of PLNCs-comprised subpixels for 3D display (5-primary colors)

| Color display mode | Left eye subpixel(s) | Right eye subpixel(s) |
|---|---|---|
| | C + B | R + G + V |
| | B + V | R + G + C |
| R + Y + G + C + B | R | Y + G + B |
| | G | C + B + Y |
| | C | R + G + B + Y |
| | B | R + G + C + Y |
| | Y | R + G + C + G |
| | R + Y | G + C + B |
| | R + B | G + C + Y |
| | R + C | G + B + Y |
| | R + G | C + B + Y |
| | G + Y | R + C + B |
| | G + B | R + C + Y |
| | G + C | R + B + Y |
| | C + Y | R + G + B |
| | C + B | R + G + Y |
| | B + Y | R + G + C |
| R + Y + G + C + V | R | Y + G + V |
| | G | C + V + Y |
| | C | R + G + V + Y |
| | V | R + G + C + Y |
| | Y | R + G + C + G |
| | R + Y | G + C + V |
| | R + V | G + C + Y |
| | R + C | G + V + Y |
| | R + G | C + V + Y |
| | G + Y | R + C + V |
| | G + V | R + C + Y |
| | G + C | R + V + Y |
| | C + Y | R + G + V |
| | C + V | R + G + Y |
| | V + Y | R + G + C |
| R + Y + G + B + V | R | Y + G + V |
| | G | B + V + Y |
| | B | R + G + V + Y |
| | V | R + G + B + Y |
| | Y | R + G + B + G |
| | R + Y | G + B + V |
| | R + V | G + B + Y |
| | R + B | G + V + Y |
| | R + G | B + V + Y |
| | G + Y | R + B + V |
| | G + V | R + B + Y |
| | G + B | R + V + Y |
| | B + Y | R + G + V |
| | B + V | R + G + Y |
| | V + Y | R + G + B |

TABLE 4

Color patterning manner of PLNCs-comprised subpixels for 3D display (6-primary colors)

| Color display mode | Left eye subpixel(s) | Right eye subpixel(s) |
|---|---|---|
| R + Y + G + C + B + V | R | Y + G + C + B + V |
| | Y | R + G + C + B + V |
| | G | R + Y + C + B + V |
| | C | R + Y + G + B + V |
| | B | R + Y + G + C + V |
| | V | R + Y + G + C + B |
| | R + Y | G + C + B + V |
| | R + G | Y + C + B + V |
| | R + C | Y + G + B + V |
| | R + B | Y + G + C + V |
| | R + V | Y + G + C + B |
| | Y + G | R + C + B + V |
| | Y + C | R + G + B + V |
| | Y + B | R + G + C + V |
| | Y + V | R + G + C + B |
| | G + C | R + Y + B + V |
| | G + B | R + Y + C + V |

TABLE 4-continued

Color patterning manner of PLNCs-comprised
subpixels for 3D display (6-primary colors)

| Color display mode | Left eye subpixel(s) | Right eye subpixel(s) |
|---|---|---|
| | G + V | R + Y + C + B |
| | C + B | R + Y + G + V |
| | C + V | R + Y + G + B |
| | B + V | R + Y + G + C |
| | R + Y + G | C + B + V |
| | R + Y + C | G + B + V |
| | R + Y + B | G + C + V |
| | R + Y + V | G + C + B |
| | R + G + C | Y + B + V |
| | R + G + B | Y + C + V |
| | R + G + V | Y + C + B |
| | R + C + B | Y + G + V |
| | R + C + V | Y + G + B |
| | R + B + V | Y + G + C |

For each individual color patterning manner in Table 1 to Table 4, the left eye and right eye subpixel(s) are interchangeable. For example, in the RGV color display mode, one of the three color patterning manners is R and V for left eye and G for right eye. This can also be switched to be G for left eye, and R and V for right eye. All other color patterning manner can be switches for left eye and right eye following the above fashion.

PLNC-2D/3D-LCDs designed from above color patterning manners have different colors for two eyes, when operated in 3D mode. No individual primary color is displayed into both eyes at the same time. Both left-eye image and right-eye image are displayed in full resolution. Thus, these displays also have the same image resolution in 3D mode as that in 2D mode.

Figure 12:
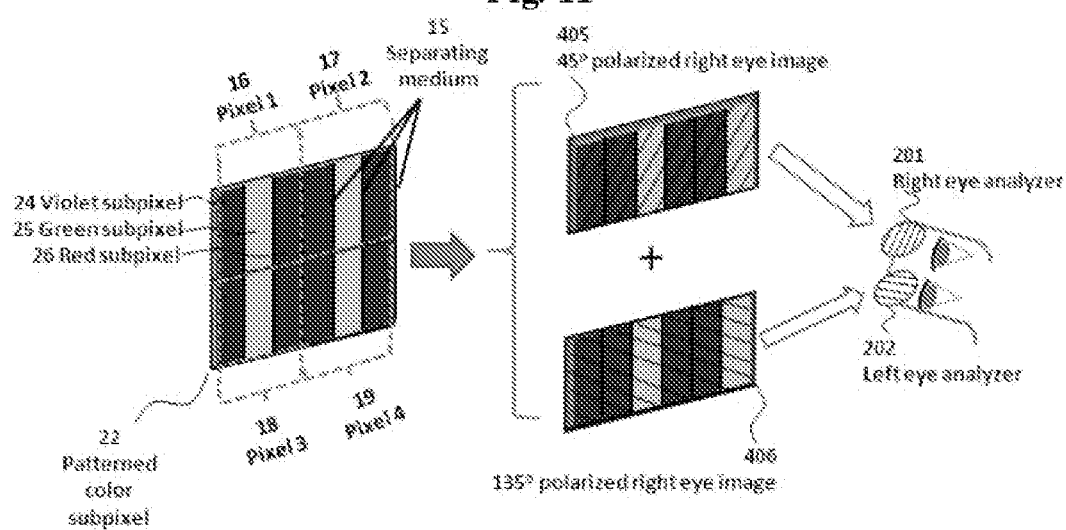
FIG. 12. 3D display illustration for PLNC-2D/3D-LCDs using linear polarizer based analyzer glasses.

The retina rivalry effects can be fully removed by displaying images to both left and right eyes at identical luminance and colors or close to that. This can be realized for PLNC-2D/3D-LCDs using passive polarized glasses, as sketched in FIG. 12. Pixels of the left eye image 406 and right eye image 405 are displayed line by line, with half of original resolution for both images. A ½ phase retarder layer is positioned in front of the display with stripes of ½ phase retarders mounted over R, G, V subpixels displaying left eye image 406. Thus, lights for the left eye image 406 are polarized perpendicular to lights for the right image 405. The polarization directions of the two analyzers, left eye analyzer 202, and right eye analyzer 201, matches to these of these of lights from left eye image 406 and right eye image 405, respectively, in the display plane. This allows the left eye of the viewer to see left eye image only, and right eye to see right eye image only. It is noticeable that both left-eye image 406 and right-eye image 405 contain full color. Also, the same or very close luminance is presented in both images. This enables PLNC-2D/3D-LCD to have identical ultra-wide color gamut in both 2D and 3D display modes, while free of neither retina rivalry nor "ghost" artifacts at the cost of half resolution in 3D display. The resolution can be improved by reducing the size of subpixels to achieve high-resolution full color 3D display for PLNC-2D/3D-LCDs.

To increase the viewing angle of displays in this invention, the linearly polarized exiting lights from the display can be converted to circularly polarized lights; by using a ¼ wave plate layer mounted in front of the display with its optical axis in 45° angle to the plane of incident linearly polarized lights.

List of Definitions in the Invention

The following definitions for layers in the present invention are listed as:

A radiation source 10: including a backlight layer 11 and a light diffuser 12.

The backlight layer 11: a layer of light source emitting UV, violet, blue or NIR lights. Light sources are semiconductor UV-LEDs, violet-LED, blue LEDs, NIR LEDs, mercury plasma discharge lamp. This layer is defined as a back layer.

In addition, the backlight layer is composed of an array of ultraviolet-emitting semiconductor AlGaN or AlGaInN light emitting diodes (LEDs), violet-emitting GaInN semiconductor LEDs, blue-emitting GaInN semiconductor LEDs, near-infrared LEDs, near-infrared lasers, near-infrared lamps, plasma discharge lamps.

The light diffuser 12: a layer for evenly diffusing lights from backlight layer 11 towards front layers.

A dichroic coating layer 21: a layer composed of dichroic materials which let lights from backlight to pass but reflect or absorb lights emitted from the patterned color subpixel layer 22.

A Patterned color subpixel layer 22: a layer contains PLNCs either in solution, as a film, or dispersed in a polymeric solid film. This layer also contains separating medium 19 to define the layer into grids and barrier lights to transmit from one grid to others. Each grid is filled with a kind of PLNC. The compositions of PLNCs include these in Table 1. Two or more kinds of PLNCs with individual photoluminescence spectra in the visible range can be used. These grids embedded with PLCNs are defined as subpixels. The patterning of color subpixels in this layer includes these shown in FIG. 10 and other derived patterns. The patterned color subpixel layer includes a photoluminescent layer.

A dichroic coating layer 23: a layer composed of dichroic materials which let lights from backlight layer 11 to be reflected or absorbed but pass lights emitted from the patterned color subpixel layer 22.

A first linear polarizer layer 31: a layer which can convert lights from the backlight layer 11 to linearly polarized lights to emit to front layers. The polarization direction of angle is within the plane of this layer, with an angle of 0° or 45° to the horizontal direction.

A first glass layer 1: a transparent glass layer as a support medium for other layers, the position of this layer is under the liquid crystal layer 32, but may not be in direct contact.

Thin film transistor layer (TFT layer 2): a layer composed of thin film transistors and conducting electrodes which can be used to apply voltage over the liquid crystal layer. This layer also has the subpixel structure with each subpixel can superimpose on a subpixel in the patterned color subpixel layer 22.

A first alignment layer 3: a polymer polyimide layer placed directly under the 1st spacer layer to facilitate the alignment direction of liquid crystals.

A first spacer layer 4: a layer with micrometer size polymer beads or frame structures, position directly under the liquid crystal layer 32.

A liquid crystal layer 32: a layer filled with liquid crystals which can have different alignment patterns. This layer can rotate the polarization direction of angles depending on the applied voltage over the liquid crystal, the thickness of the layer, and the wavelength of the incident light.

A second spacer layer 5: a layer with micrometer size polymer beads or frame structures, position directly above the liquid crystal layer 32.

A second alignment layer 6: a polymer polyimide layer placed directly above the second space layer the liquid crystal layer to facilitate the alignment direction of liquid crystals.

A common electrode layer 7: a layer of electrodes together with the TFT layer 3 to apply voltage over the liquid crystal layer 32.

A second glass layer 8: a transparent glass layer as a solid support other layers, the position of this layer is above the liquid crystal layer 32, but not in direct contact.

A second linear polarizer layer 33: a layer of linear polarizer, with in plane polarization angle 90° or 135° which is orthogonal to these in 1st linear polarizer layer 31, 0° or 45°, respectively.

An anti-reflection layer 190: a layer to reduce surface reflection on the display surface.

A line-patterned ½ phase retarder layer 150: a layer of ½ phase retarder film, which is patterned in a way that on the layer ½ phase retarder strip and transparent medium strip alternatively appears. For the ½ phase retarder strip, the optical axis is in the layer plane and in an angle of 45° or 90° to the horizontal. The polarization direction of angle, of incident linearly-polarized lights with 45° polarization angle to the optical axis of the ½ phase retarder strip, will be rotated for 90° in the plane.

An UV-blocking layer 180: a layer with long-pass filters which absorbs UV lights but pass visible lights.

A third transparent layer 170: a transparent support layer above the second glass layer 13 but not in direct contact.

A grid-patterned ½ phase retarder layer 151: a layer of patterned ½ phase retarder film, with alternative ½ phase retarder grid and transparent medium grid. For ½ phase retarder grids, the optical axis is in the layer plane and in, an angle of 45° or 90° to the horizontal. The polarization direction of angle, of incident linearly-polarized lights with 45° polarization angle to the optical axis of ½ phase retarder grids, will be rotated for 90° in the plane.

A ¼ wave plate layer 160: a layer of ¼ wave plate which convert incident linearly polarized lights into circularly polarized lights, when the incident linearly polarized lights has the polarization angle of 45° or 135° to the optical axial of the wave plate.

A line-patterned ¼ wave plate layer 161: a patterned layer of alternative ¼ wave plate strips with optical axis at 45° or 135° alternatively, or with optical axis at 90° or 180° alternatively. The ¼ wave plate strips can convert incident 90° or 135° linearly polarized lights into alternatively strips of right-circularly polarized lights and left-circularly polarized lights.

A grid-patterned ¼ wave plate layer 162: a grid-patterned layer of ¼ wave plate with alternative ¼ wave plate grids, with optical axis at 45° or 135° alternatively, or with optical axis at 90° or 180° alternatively. The ¼ wave plate grids can convert incident 90° or 135° linearly polarized lights into alternatively grids of right-circularly polarized lights and left-circularly polarized lights.

A first line-patterned linear polarizer layer 35: a layer of line-patterned linearly polarizer, comprised by alternative linear polarizer lines to convert incident unpolarized lights into linearly polarized lights with alternative 0° and 90° polarization direction, or 45° and 135° polarization direction. This layer is disposed below the liquid crystal layer 22, but not in direct contact.

A second line-patterned linear polarizer layer 36: a layer of line-patterned linearly polarizer, comprised by alternative linear polarizer lines to convert incident unpolarized lights into linearly polarized lights with alternative 90° and 0° polarization direction, or 135° and 45° polarization direction. This layer is disposed above the liquid crystal layer 22 but not in direct contact.

A first grid-patterned linear polarizer layer 37: a layer of grid patterned linearly polarizer, comprised by alternative linear polarizer grid and transparent medium grid in both horizontal and vertical direction of the layer. It positioned below the second grid-patterned linear polarizer layer 36 but not in direct contact.

A second grid-patterned linear polarizer layer 38: a layer of grid patterned linearly polarizer, comprised by alternative linear polarizer grid and transparent medium grid in both horizontal and vertical direction of the layer. It positioned above the second grid-patterned linear polarizer layer 38 but not in direct contact. Each linear polarizer grid in second grid-patterned linear polarizer layer 38 is superimposed on a linear polarizer grid in first grid-patterned linear polarizer layer 35 but with a difference in the polarization angle for 90° in the plane.

PREFERRED EMBODIMENTS

PLNC-2D-LCD and PLNC-2D/3D-LCD in the present invention can be described in the following preferred embodiments, with reference to the accompanying drawings.

Figure 13:
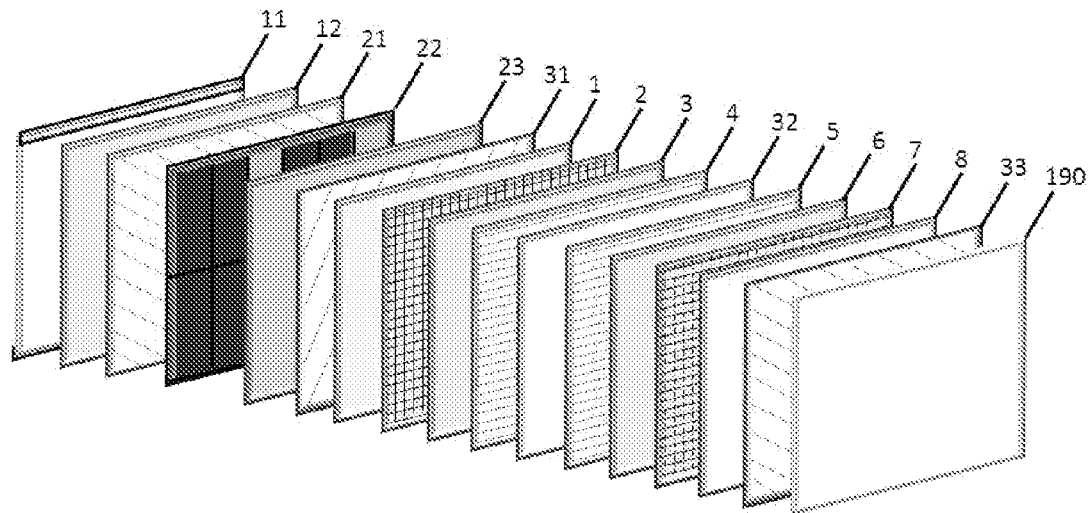
FIG. 13. Side view of the PLNC-2D/3D-LCD structure in Embodiment 1.
Figure 14:
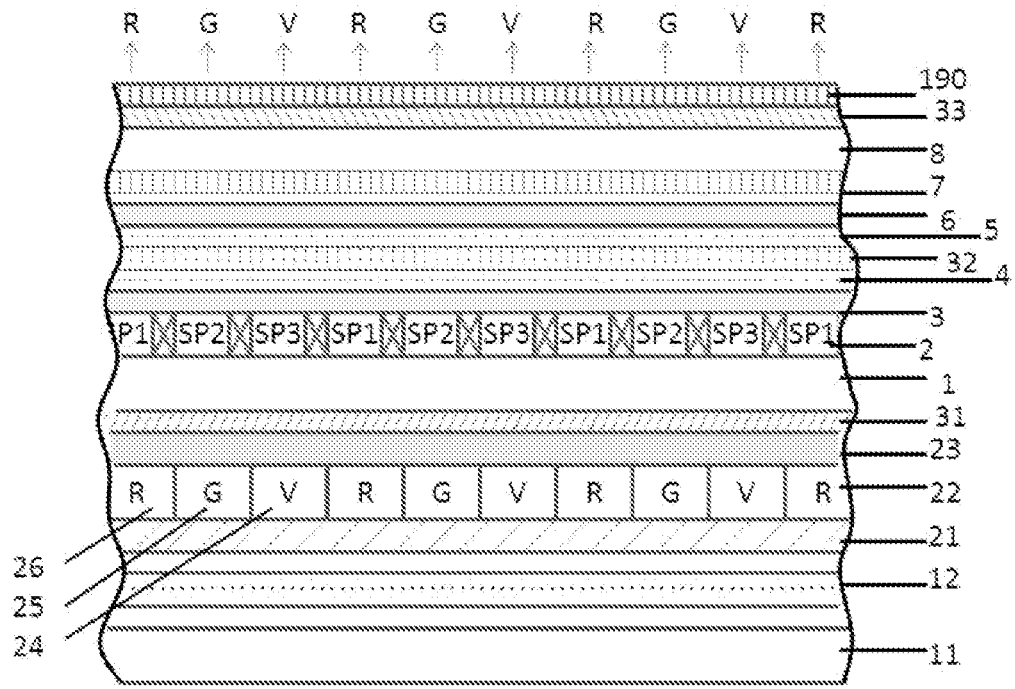
FIG. 14. Cross section view of FIG. 12 in Embodiment 1.
Figure 15:
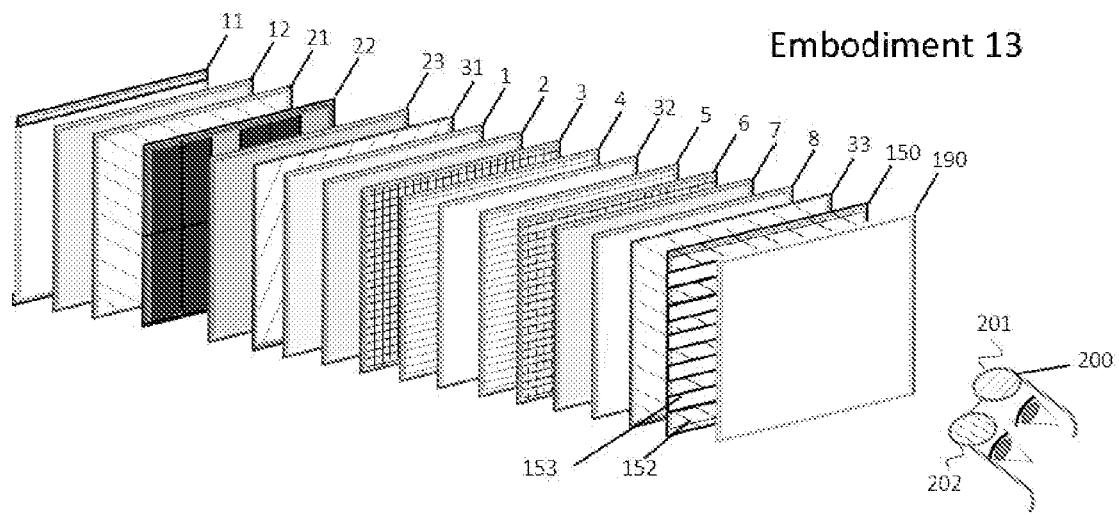
FIG. 15. Side view of the PLNC-2D/3D-LCD structure in Embodiment 13.
Figure 16:
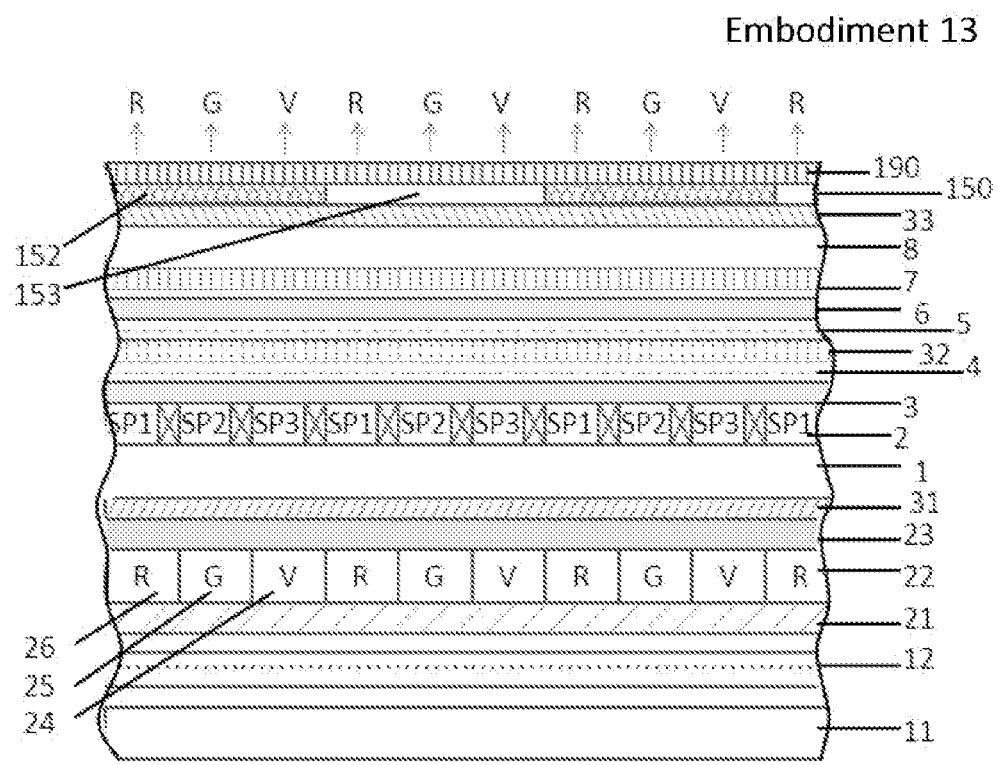
FIG. 16. Cross section view of FIG. 15 in Embodiment 13.
Figure 17:
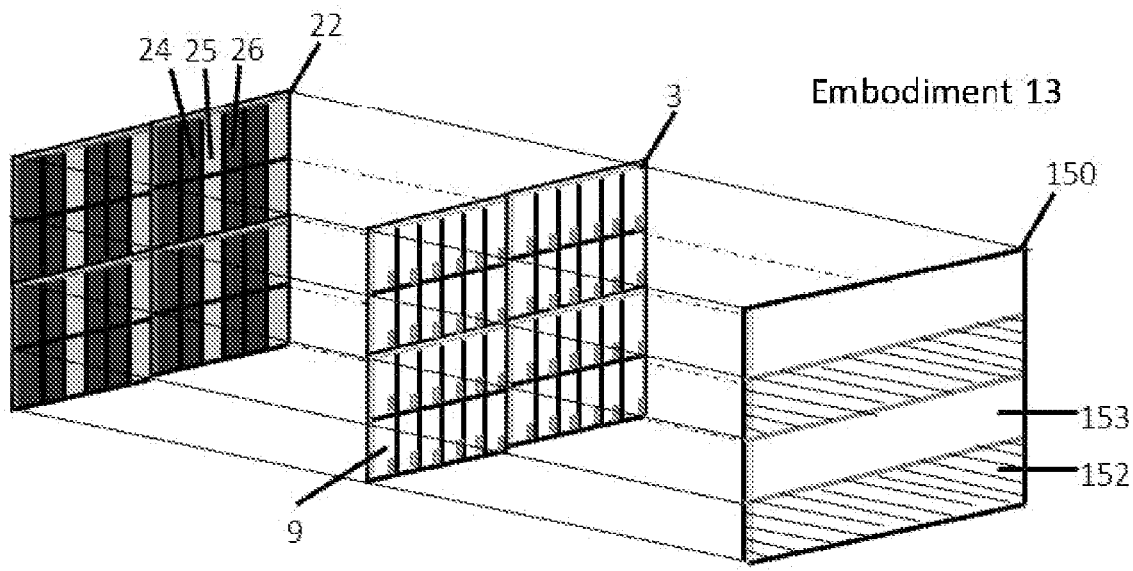
FIG. 17. Side view of the pixel and polarization alignments of PLNC-2D/3D-LCD in Embodiment 1.
Figure 18:
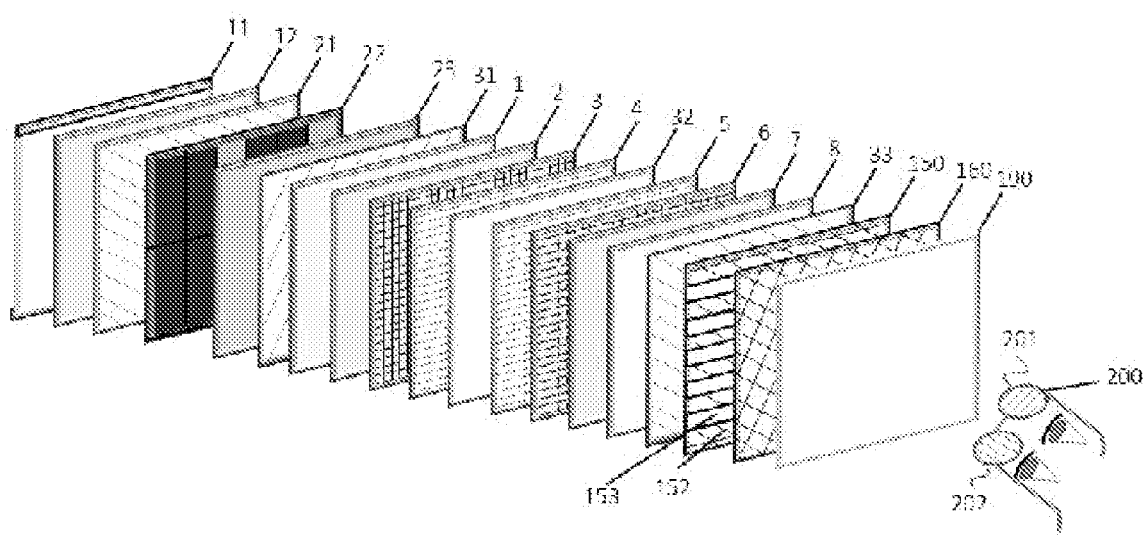
FIG. 18. Side view of the PLNC-2D/3D-LCD structure in Embodiment 25.
Figure 19:
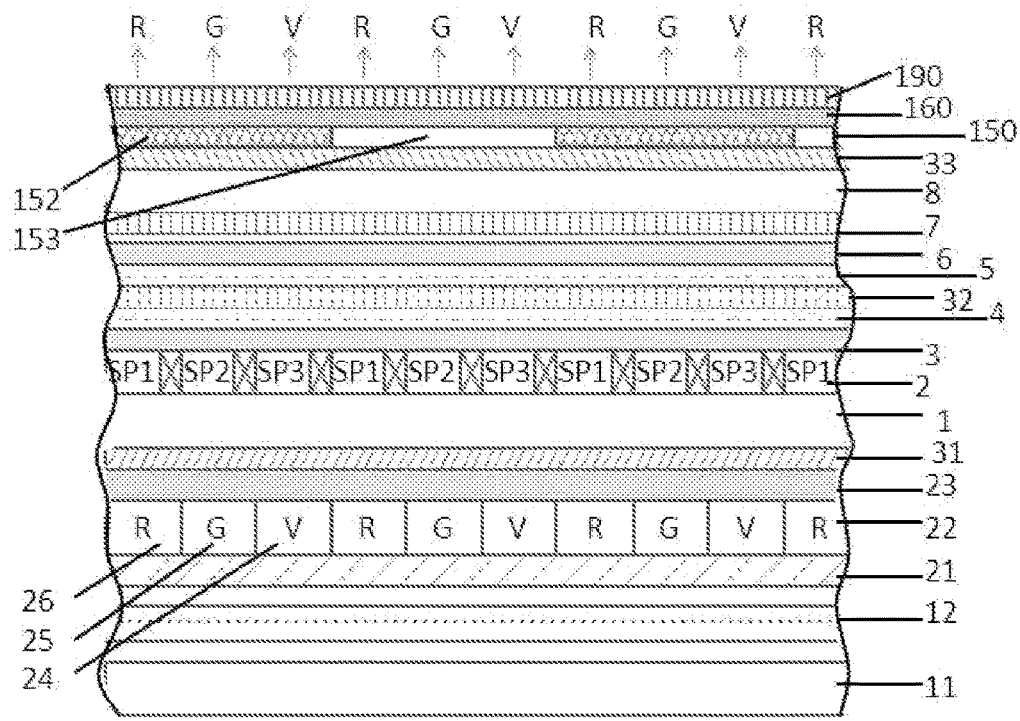
FIG. 19. Cross section view of FIG. 18 in Embodiment 25.
Figure 20:
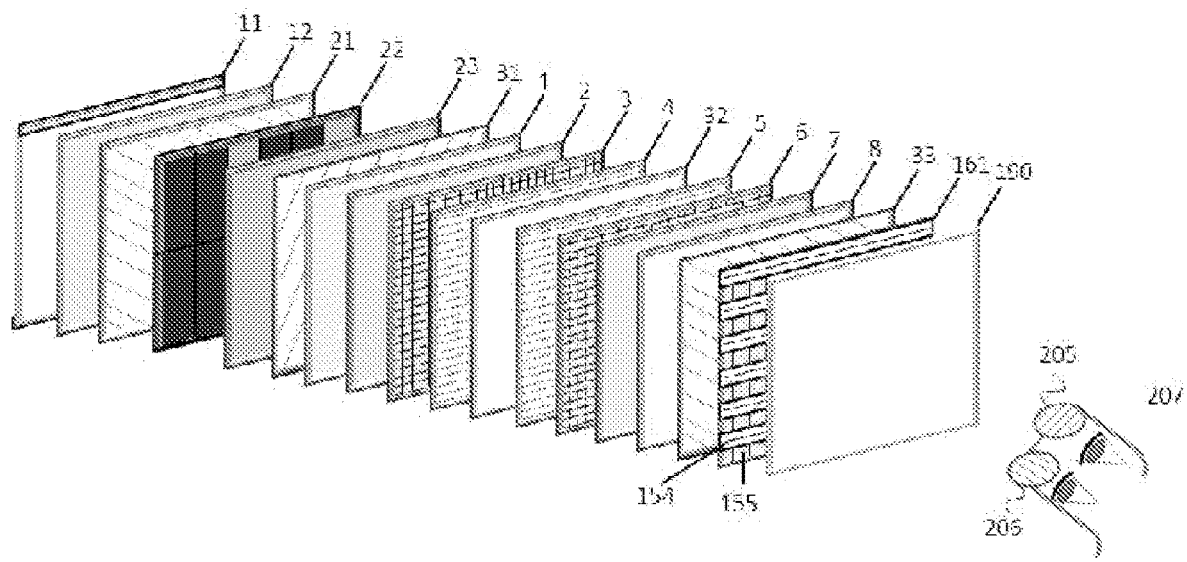
FIG. 20. Side view of the PLNC-2D/3D-LCD structure in Embodiment 37.
Figure 21:
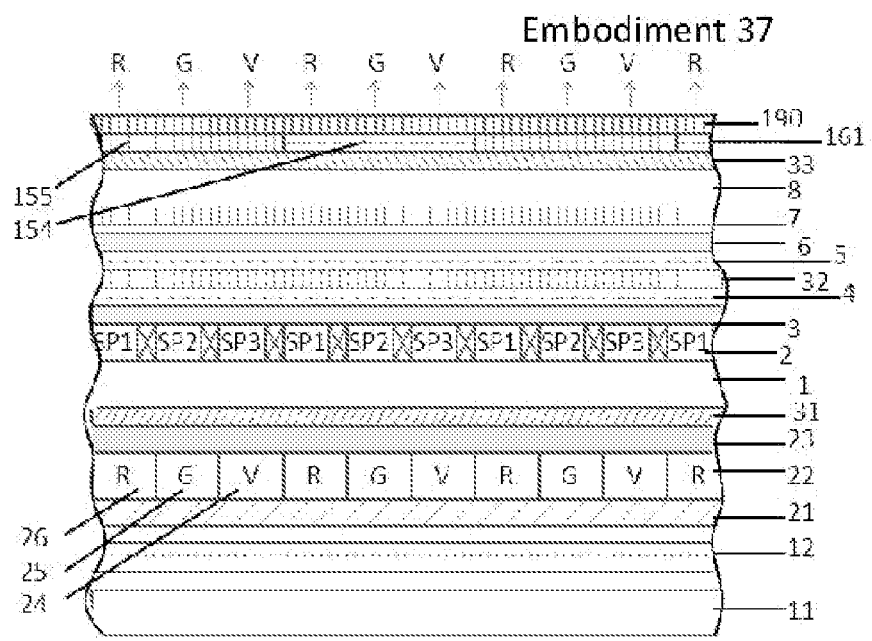
FIG. 21. Cross section view of FIG. 20 in Embodiment 37.
Figure 22:
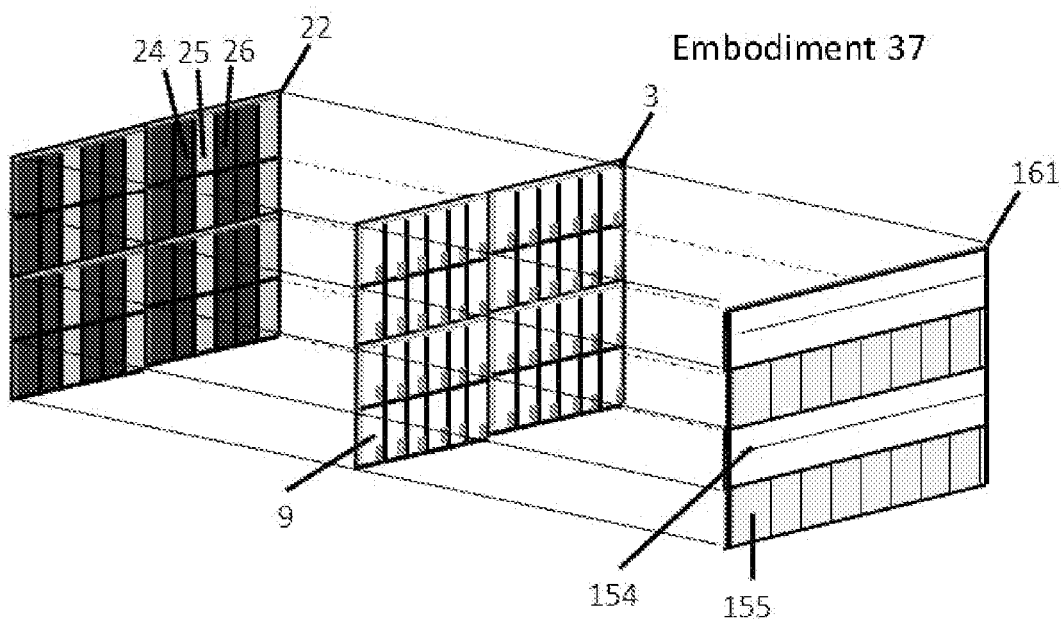
FIG. 22. Side view of the pixel and polarization alignments of PLNC-2D/3D-LCD in Embodiment 37.
Figure 23:
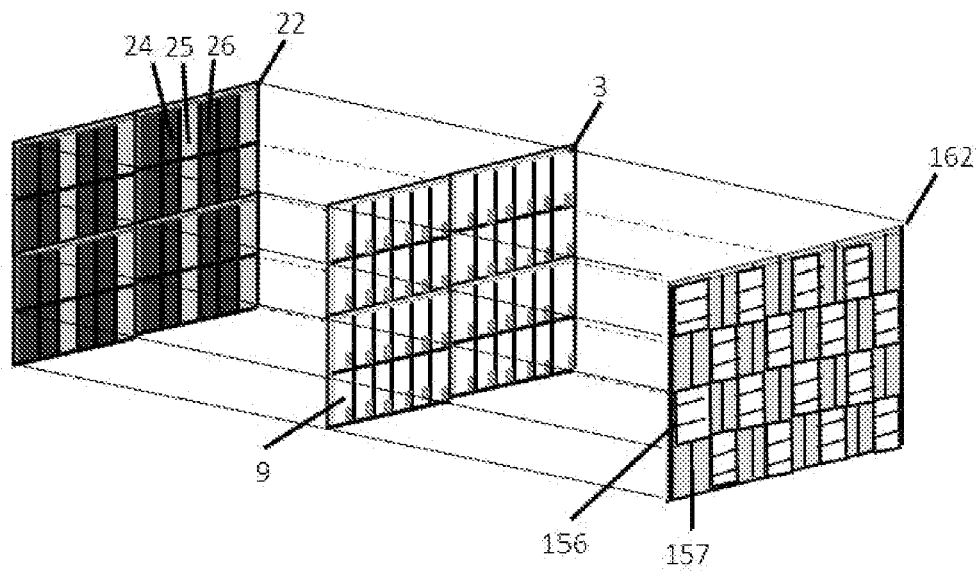
FIG. 23. Side view of the pixel and polarization alignments of PLNC-2D/3D-LCD in Embodiment 49.
Figure 24:
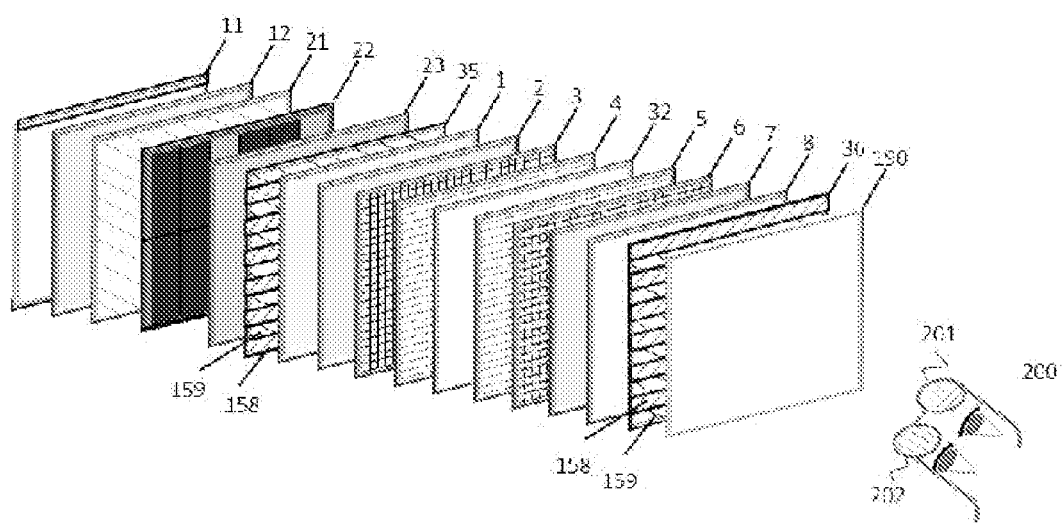
FIG. 24. Side view of the PLNC-2D/3D-LCD structure in Embodiment 61.
Figure 25:
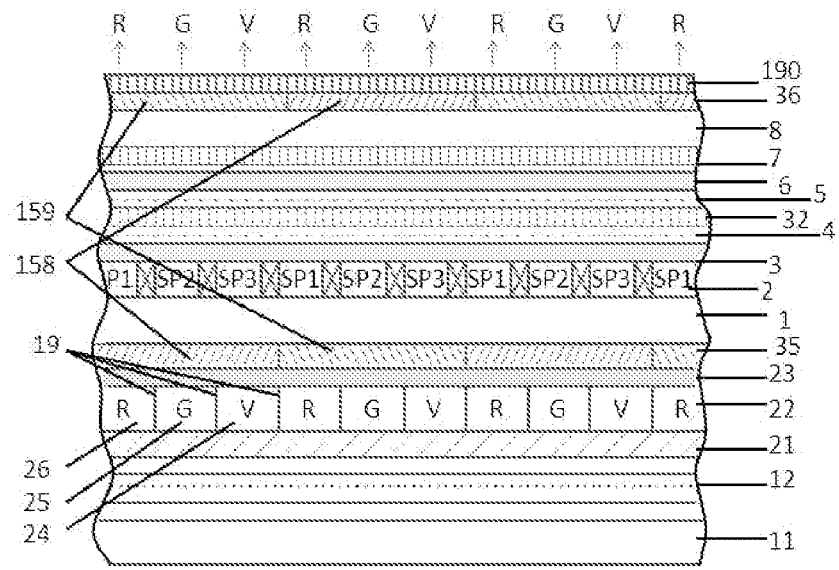
FIG. 25. Cross section view of FIG. 24 in Embodiment 61.
Figure 26:
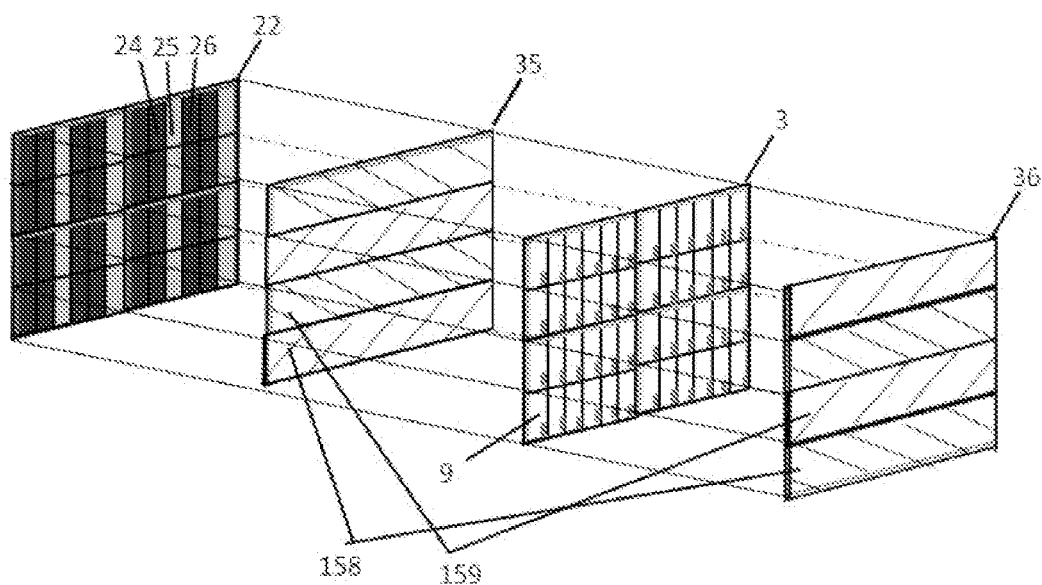
FIG. 26. Side view of the pixel and polarization alignments of PLNC-2D/3D-LCD in Embodiment 61.
Figure 27:
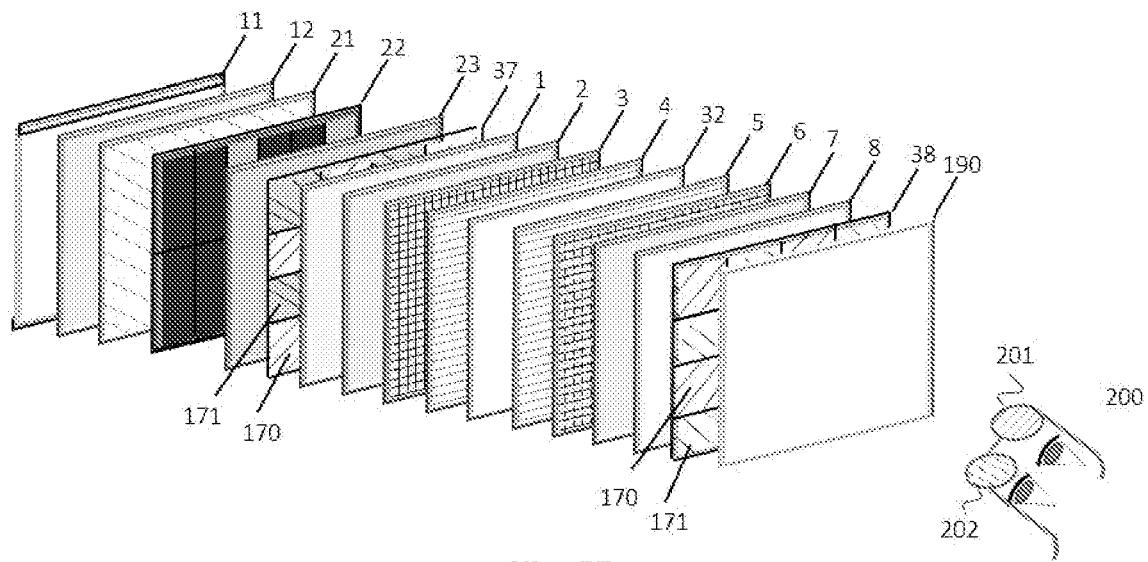
FIG. 27. Side view of the PLNC-2D/3D-LCD structure in Embodiment 73.
Figure 28:
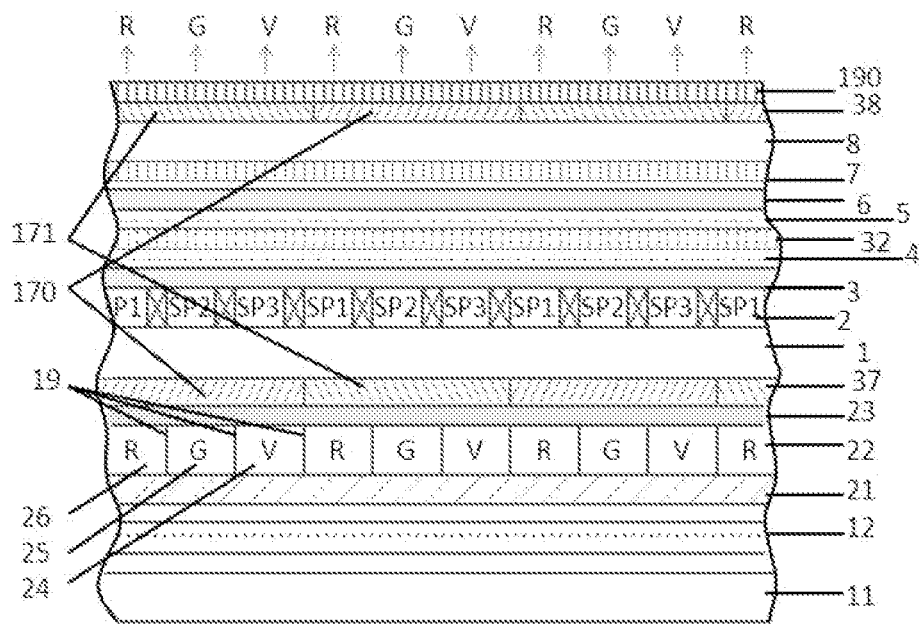
FIG. 28. Cross section view of FIG. 27 in Embodiment 73.
Figure 29:
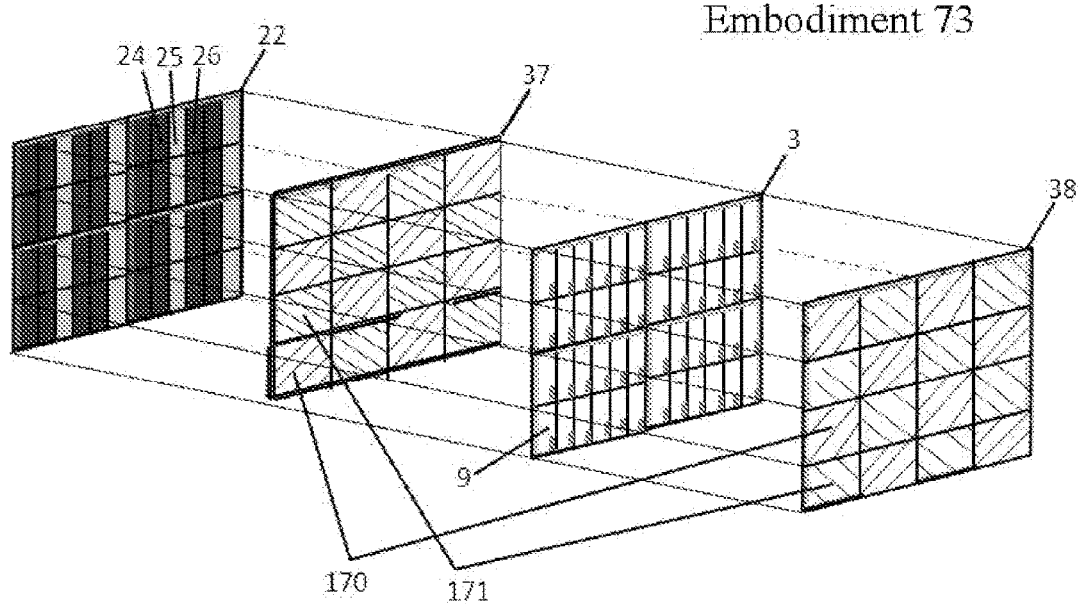
FIG. 29. Side view of the pixel and polarization alignments of PLNC-2D/3D-LCD in Embodiment 73.
Figure 30:
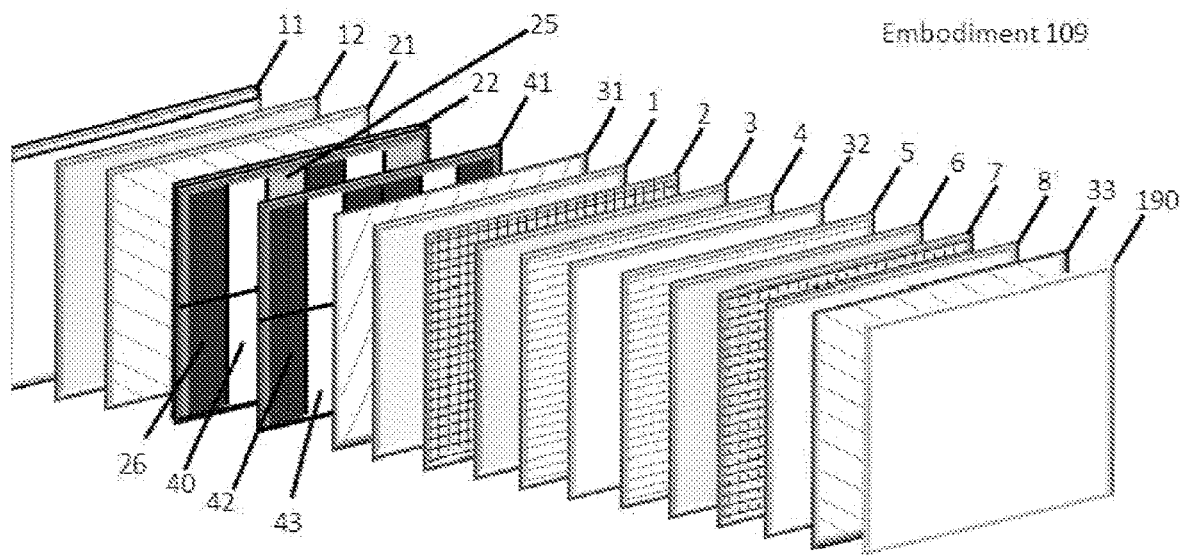
FIG. 30. Side view of the PLNC-2D/3D-LCD structure in Embodiment 109.
Figure 31:
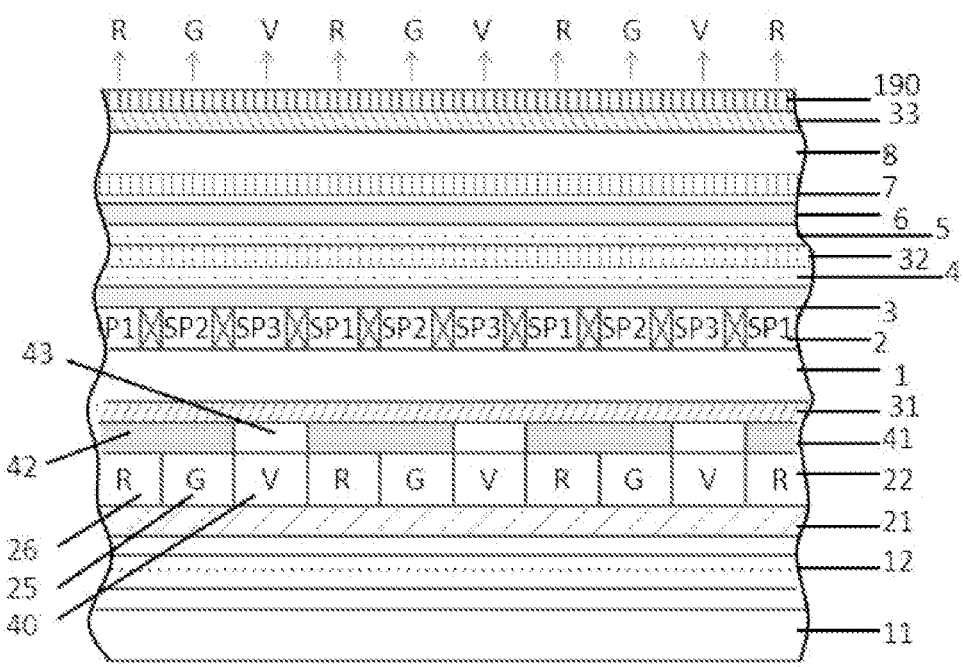
FIG. 31. Cross section view of FIG. 30 in Embodiment 109.
Figure 32:
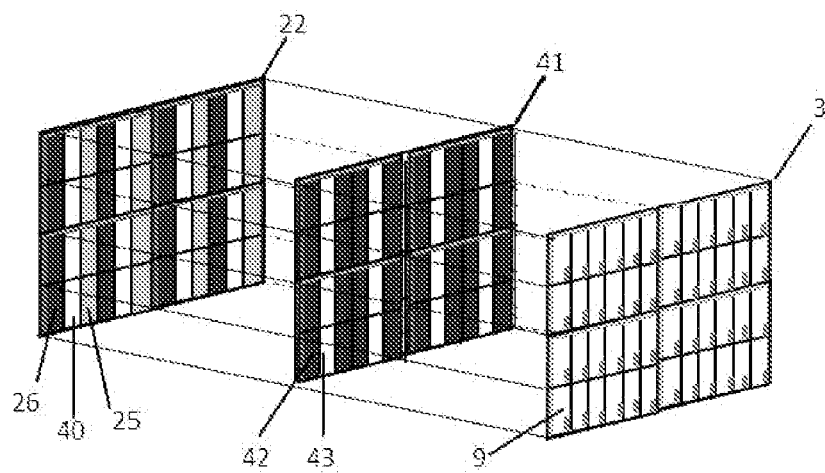
FIG. 32. Side view of the pixel and polarization alignments of PLNC-2D/3D-LCD in Embodiment 109.
Figure 33:
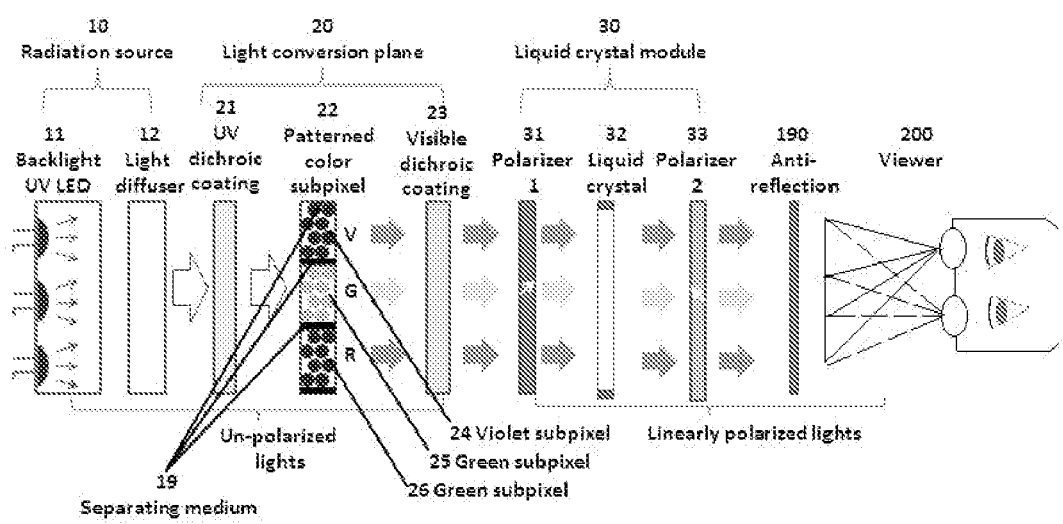
FIG. 33 shows viewer watches the LCD device with the active shutter liquid crystal glasses.

FIG. 13 to FIG. 32 show the structure of LCD display structures: FIGS. 13-14 are for Embodiment 1, FIGS. 15-17 are for Embodiment 13, FIGS. 18-19 are for Embodiment 25, FIGS. 20-22 are for Embodiment 37, FIG. 23 is for Embodiment 49, FIGS. 24-26 are for Embodiment 61, FIGS. 27-29 are for Embodiment 73, FIGS. 30-32 are for Embodiment 109.

Embodiment 1 and Embodiment 2

The PLNC-2D/3D-LCD device according to a first embodiment of the present invention will be described with reference to FIG. 13 and FIG. 14. The patterned color subpixel layer, with PLNCs embedded for emitting lights of primary colors in the device, is given the reference 22. Polarizing regions are given reference numbers of 31, 33, 35, 36, 150, 151, 160, 161, and 162 in order to recognize the regions from a polarizing film because the polarizing directions are orthogonal at 90° in a lattice shape on one plane.

As shown in FIG. 13 and FIG. 14, in the liquid crystal capable of displaying a 2D image in the first embodiment, the backlight layer 11 emitting UV lights is aligned below the light diffuser layer 12. Above that is the patterned color subpixel layer 22 which is aligned between the below dichroic layer 21 and the above dichroic layer 23. Above that, a first linear polarizer layer 31, having a polarizing direction of 0° or 45° to the horizontal direction in the plane of the layer, is placed. A first glass layer 1 is aligned at a front surface of the first linear polarizer layer 31. A first transparent electrode layer, or the thin film transistor layer (TFT layer 2), a first alignment layer 3, and the first spacer layer 4, are disposed at the front surface of the same. A liquid crystal layer 32 filled with a liquid crystal is disposed between the first space layer 4 and second space layer 5. Above that a second alignment layer 6, and a common electrode layer 7 are deposed sequentially. Next, a second glass layer 8 is disposed at a front surface of the common electrode layer 7. A second linear polarizer layer 33, having a polarizing direction of 90° or 135°, is disposed. The outmost layer is an anti-reflection layer 190.

Here, the alignment directions of the first alignment layer 3 and the alignment directions of the second alignment layer 6 may be different based on the kinds of liquid crystal. It is preferred that the two alignment directions are vertical, or in the same direction, depending on the kinds of liquid crystal. When electromagnetic field is applied to the liquid crystal layer 32, it is moved based on the characteristics of the liquid crystal. Therefore, it is need to retard transmitting light.

Here, the first linear polarizer layer 31 before the liquid crystal layer 32 has a polarizing direction of 0° or 45°, and the second linear polarizer layer 33 after the liquid crystal layer 33 has a polarizing direction of 90° or 135°. The polarizing direction is orthogonal at 90° between the first linear polarizer layer 31 and the second linear polarizer layer 33. have the same polarizing direction but with 90° difference.

In conventional LCDs, a color filter layer is used to absorb most of the incident lights and only pass primary color lights through. In this embodiment of the present invention, there is no color filter layer. Instead, a patterned color subpixel layer 22 is used. Three PLNCs comprise a pixel, which contains a subpixel of red PLNCs, a subpixel of green PLNCs, and a subpixel of violet PLNCs. This tri-primary color mode is R+G+V 210. The patterned color subpixel layer 22 is comprised by repeating pixels with the above subpixel structure. Here, the subpixels are aligned in a way that their dimensions and positions can be superimposed by the subpixel grids in the TFT layer 2 in a one-to-one fashion.

The operation of the 2D LCD according to the first embodiment of the present invention will be described. First, when uniform backlights from backlight layer 11 transmit the color subpixel layer 22, lights are absorbed by PLNCs to excite their color emissions. Specifically, red subpixel 26 emit red lights, green subpixel 25 emit green lights, and violet subpixel 24 (or blue subpixel 27) emit violet lights (or blue lights), respectively. The transmitted UV lights are reflected by the second dichroic layer to excite the patterned color subpixel layer 22 again, in order to improve the light utilization efficiency. Emitted visible lights are in all directions and not polarized. Emitted lights towards the first dichroic layer 21 will be reflected back to have forward propagating direction towards the second dichroic layer 23, in order to improve the light utilization efficiency. The combined visible lights are directed to pass through the first linear polarizer layer 31, lights become a straight line polarized light beam polarized at 0° or 45°. As a result, after lights pass the liquid crystal layer 32 with polarization direction rotated for 90°, a viewer can view the image transmitted through the second linear polarizer 33 having a polarizing direction of 90° or 135°.

In 3D viewing mode, the viewer can wear a pair of active shutter glasses which are synchronized with the refresh rate of the PLNC-2D/3D-LCD display to intermittently blocking left-eye viewing and right-eye viewing so to deliver left-eye image at one short time and right-eye image at another short time.

In Embodiment 2, the violet subpixel 24 can be changed to blue subpixel 27, and the tri-primary color mode of the display changes to R+G+B 211.

Embodiment 3 to Embodiment 7

The 2D PLNC-2D-LCDs in Embodiment 3 to Embodiment 7 have similar basic constructions with that of the Embodiment 1 of the present invention. However, they differ in the number of subpixels comprising each pixel. Each pixel has four subpixels, and thus the resulting displays have different 4-primary color modes. Embodiment 3 to Embodiment 7 have 4-primary color modes of R+G+B+V 212, R+G+C+B 213, R+G+C+V 214, R+Y+G+V 215, and R+Y+G+B 216, respectively (FIG. 10).

Embodiment 8 to Embodiment 11

The 2D PLNC-2D-LCDs in Embodiment 8 to Embodiment 11 have similar basic constructions with that of the Embodiment 1 of the present invention. However, they differ in the number of subpixels comprising each pixel. Each pixel has five subpixels, and thus the resulting displays have different 5-primary color modes. Embodiment 8 to Embodiment 11 has 5-primary color modes of R+G+C+B+V 217, R+Y+G+C+B 218, R+Y+G+B+V 219, and R+Y+G+C+B 220, respectively (FIG. 10).

Embodiment 12

The 2D PLNC-2D-LCDs in Embodiment 12 has similar basic constructions with that of the Embodiment 1 of the present invention. However, they differ in the number of subpixels comprising each pixel. Each pixel has six subpixels, and thus the resulting display has the 6-primary color modes R+Y+G+C+B+V 221 (FIG. 10).

Embodiment 13 and Embodiment 14

FIG. 15 and FIG. 16 show the Embodiment 13, a PLNC-2D/3D-LCD, of the present invention. The basic construction is similar with the construction of the Embodiment 1 of the present invention. The same construction as in Embodiment 1 will be omitted. An additional line-patterned ½ phase retarder layer 150 is disposed between the second polarizer layer 33 and the anti-reflection layer 190. The line-patterned ½ phase retarder layer 150 is composed by alternative strips of ½ phase retarder 152 and transparent medium 153. Here, the width of each strip is the same as the height of a subpixel of the patterned color subpixel layer 22. As shown in FIG. 16 and FIG. 17, the line-patterned ½ phase retarder layer 150 is disposed in a way that each strip can be superimposed on a line of pixels in the patterned color subpixel layer 22 and also a line of subpixels 9 in the TFT layer 3. The ½ phase retarder 152 and the transparent medium 153 strips alternatively cover a line of pixels.

The operation of the switchable 2D/3D LCD according to embodiment 13 of the present invention will be described. First, lights pass through the layers from backlight 11 until second linear polarizer layer 33 will be the same as in Embodiment 1, and will be omitted. Image lights, linearly polarized and exiting from the second linear polarizer layer 33, pass through the line-patterned ½ phase retarder layer 150 and split into left eye image and right eye image. Lights passing through ½ phase retarder 152 strips change the polarization direction from 90° or 135° to 0° or 45°, lights passing through transparent medium 153 strips keep their polarization direction 90° or 135° unchanged. When the viewer does not wear a pair of analyzer glasses, both eyes of the viewer perceive the same image from the display, and the image is displayed as 2D. When the viewer wears a pair of analyzer glasses, then the display can be 3D. The left eye analyzer glass 202 is a linear polarizer with polarization direction angle of 0° or 45°, and the right eye analyzer glass 201 is a linear polarizer with polarization direction angle of 90° or 135°. Thus, lights exiting from ½ phase retarder 152 strips can only pass the left eye analyzer 202 and can be perceived by the viewer as the left-eye image. Lights exiting from transparent medium 153 strips can only pass the right eye analyzer 201 and can be perceived by the viewer as the right-eye image. Therefore, the left-eye image and right-eye image be seen by the view simultaneously, and the viewer can perceive the 3D image.

In Embodiment 14, the violet subpixel 24 can be changed to blue subpixel 27, and the tri-primary color mode of the 3D display changes from R+G+V 210 to R+G+B 211.

Embodiment 15 to Embodiment 19

The 2D/3D switchable PLNC-2D/3D-LCDs in Embodiment 15 to Embodiment 19 have similar basic constructions with that of the Embodiment 13 of the present invention. However, they differ in the number of subpixels comprising each pixel. Each pixel has four subpixels, and thus the resulting displays have different 4-primary color modes. Embodiment 15 to Embodiment 19 have 4-primary color modes of R+G+B+V 212, R+G+C+B 213, R+G+C+V 214, R+Y+G+V 215, and R+Y+G+B 216, respectively (FIG. 10).

Embodiment 20 to Embodiment 23

The 2D/3D switchable PLNC-2D/3D-LCDs in Embodiment 20 to Embodiment 23 have similar basic constructions with that of the Embodiment 13 of the present invention. However, they differ in the number of subpixels comprising each pixel. Each pixel has five subpixels, and thus the resulting displays have different 5-primary color modes. Embodiment 20 to Embodiment 23 have 5-primary color modes of R+G+C+B+V 217, R+Y+G+C+B 218, R+Y+G+B+V 219, and R+Y+G+C+B 220, respectively (FIG. 10).

Embodiment 24

The 2D/3D switchable PLNC-2D/3D-LCDs in Embodiment 24 has similar basic constructions with these of the Embodiment 13 of the present invention. However, they differ in the number of subpixels comprising each pixel. Each pixel has six subpixels, and thus the resulting display has the 6-primary color modes R+Y+G+C+B+V 221 (FIG. 10).

Embodiment 25 and Embodiment 26

FIG. 18 and FIG. 19 show the Embodiment 25, a PLNC-2D/3D-LCD, of the present invention. The basic construction is similar with the construction of the Embodiment 13 of the present invention. The same construction as in Embodiment 13 will be omitted. An additional ¼ wave plate layer 160 is disposed in front of the line-patterned ½ phase retarder layer 150 but below the anti-reflection layer 190. The ¼ wave plate layer 160 is a film with its optical axis at 45° or 90°. Incident linearly polarized lights have polarization direction angle with 45° to the optical axis of the ¼ wave plate layer 160 transmits through the plate and exiting with polarization changes from linear to circular.

The operation of the switchable 2D/3D LCD according to the Embodiment 25 of the present invention will be described. First, lights pass through the layers from backlight 11 until line-patterned ½ phase retarder layer 150 will be the same as in Embodiment 13, and will be omitted. Second, linearly polarized lights for the left eye image polarized at 0° or 45° transmit through the ¼ wave layer 160 with optical axis at 45° or 90° and exit as left circularly polarized lights. Third, linearly polarized lights for the right eye image polarized at 90° or 135° transmit through the ¼ wave plate layer 160 with optical axis at 45° or 90° and exit as right circularly polarized lights. In 3D viewing mode, the viewer wears a pair of analyzer glasses 207. The left eye analyzer 206 can let left-circularly polarized lights to pass through, but absorb right-circularly polarized lights. The right eye analyzer 205 can let right-circularly polarized lights to pass through, but absorb left-circularly polarized lights. In this way, the left-circularly polarized left image can be seen by the left eye, and right-circularly polarized left image can be seen by the right eye. Therefore, the left-eye image and right-eye image be seen by the view simultaneously, and the viewer can perceive the 3D image. In this Embodiment, the viewer's head can be tilted towards left or right direction without losing the images. Thus the PLNC-2D/3D-LCD in this embodiment has a large viewing angle.

In Embodiment 26, the violet subpixel 24 can be changed to blue subpixel 27, and the tri-primary color mode of the 3D display changes from R+G+V 210 to R+G+B 211.

Embodiment 27 to Embodiment 31

The 2D/3D switchable PLNC-2D/3D-LCDs in Embodiment 27 to Embodiment 31 have similar basic constructions with that of the Embodiment 25 of the present invention. However, they differ in the number of subpixels comprising each pixel. Each pixel has four subpixels, and thus the resulting displays have different 4-primary color modes. Embodiment 27 to Embodiment 31 have 4-primary color modes of R+G+B+V 212, R+G+C+B 213, R+G+C+V 214, R+Y+G+V 215, and R+Y+G+B 216, respectively (FIG. 10).

Embodiment 32 to Embodiment 35

The 2D/3D switchable PLNC-2D/3D-LCDs in Embodiment 32 to Embodiment 35 have similar basic constructions with that of the Embodiment 25 of the present invention. However, they differ in the number of subpixels comprising each pixel. Each pixel has five subpixels, and thus the resulting displays have different 5-primary color modes. Embodiment 32 to Embodiment 35 have 5-primary color modes of R+G+C+B+V 217, R+Y+G+C+B 218, R+Y+G+B+V 219, and R+Y+G+C+B 220, respectively (FIG. 10).

Embodiment 36

The 2D/3D switchable PLNC-2D/3D-LCDs in Embodiment 36 has similar basic constructions with that of the Embodiment 25 of the present invention. However, they differ in the number of subpixels comprising each pixel. Each pixel has six subpixels, and thus the resulting display has the 6-primary color modes R+Y+G+C+B+V 221 (FIG. 10).

Embodiment 37 and Embodiment 38

FIG. 20 and FIG. 21 show the Embodiment 37, a PLNC-2D/3D-LCD, of the present invention. The basic construction is similar with the construction of the Embodiment 1 of the present invention. The same construction as in Embodiment 1 will be omitted. An additional line-patterned ¼ wave plate layer 161 is disposed in front of the second linear polarizer 33 and below the anti-reflection layer 190. The line-patterned ¼ wave plate layer 161 is comprised of ¼ wave plate strips 154 and 155 with alternative optical axis of 90° (for ¼ wave plate strip 155) and 180° (for ¼ wave plate strip 154), or 45° (for ¼ wave plate strip 155) and 135° (for ¼ plate strip 154). As shown in FIG. 22, these strips are aligned in a way that alternative strips can be superimposed on lines of pixels in the patterned color subpixel layer 22 and also a line of subpixels 9 in the TFT layer 3.

The operation of the switchable 2D/3D LCD according to the Embodiment 37 of the present invention will be described. First, lights pass through the layers from backlight 11 until second linear polarizer layer 33 will be the same as in Embodiment 1, and will be omitted. Second, exiting linearly polarized lights transmit through the line-patterned ¼ wave plate layer 161. Incident linearly polarized lights for left eye image, with polarization direction of 135° or 90°, becomes left circularly polarized lights after passing through ¼ wave plate strip 155 with optical axis at 90° or 45°. Incident linearly polarized lights for left eye image, with polarization direction of 135° or 90°, becomes right circularly polarized lights after passing through ¼ wave plate strip 154 with optical axis at 180° or 135°. In 3D viewing mode, the viewer wears a pair of analyzer glasses 207. The left eye analyzer 206 can let left-circularly polarized lights to pass through, but absorb right-circularly polarized lights. Therefore, the left-eye image and right-eye image be seen by the view simultaneously, and the viewer can perceive the 3D image. In this Embodiment, the viewer's head can be tilted towards left or right direction without losing the images. Thus the PLNC-2D/3D-LCD in this embodiment has a large viewing angle.

In Embodiment 38, the violet subpixel 24 can be changed to blue subpixel 27, and the tri-primary color mode of the 3D display changes from R+G+V 210 to R+G+B 211.

Embodiment 39 to Embodiment 43

The 2D/3D switchable PLNC-2D/3D-LCDs in Embodiment 39 to Embodiment 43 have similar basic constructions with that of the Embodiment 37 of the present invention. However, they differ in the number of subpixels comprising each pixel. Each pixel has four subpixels, and thus the resulting displays have different 4-primary color modes. Embodiment 39 to Embodiment 43 have 4-primary color modes of R+G+B+V 212, R+G+C+B 213, R+G+C+V 214, R+Y+G+V 215, and R+Y+G+B 216, respectively (FIG. 10).

Embodiment 44 to Embodiment 47

The 2D/3D switchable PLNC-2D/3D-LCD in Embodiment 44 to Embodiment 47 has similar basic constructions with that of the Embodiment 37 of the present invention. However, they differ in the number of subpixels comprising each pixel. Each pixel has five subpixels, and thus the resulting displays have different 5-primary color modes. Embodiment 44 to Embodiment 47 have 5-primary color modes of R+G+C+B+V 217, R+Y+G+C+B 218, R+Y+G+B+V 219, and R+Y+G+C+B 220, respectively (FIG. 10).

Embodiment 48

The 2D/3D switchable PLNC-2D/3D-LCDs in Embodiment 48 has similar basic constructions with that of the Embodiment 37 of the present invention. However, they differ in the number of subpixels comprising each pixel. Each pixel has six subpixels, and thus the resulting display has the 6-primary color modes R+Y+G+C+B+V 221 (FIG. 10).

Embodiment 49 and Embodiment 50

A PLNC-2D/3D-LCD in Embodiment 49 of the present invention has the basic construction similar to Embodiment 37 of the present invention. The same construction as in Embodiment 37 will be omitted. However, the line-patterned ¼ wave plate layer 161 is replaced with a grid-patterned ¼ wave plate 162. The grid-patterned layer of ¼ wave plate is comprised of alternative ¼ wave plate grids with each grid having the same dimension as a pixel. The two kinds of grids have alternative optical axis of 90° (for ¼ wave plate grid 157) and 180° (for ¼ wave plate strip 156), or 45° (for ¼ wave plate strip 157) and 135° (for ¼ wave plate strip 156). As shown in FIG. 23, these grids are aligned in a way that alternative strips can be superimposed on lines of pixels in the patterned color subpixel layer 22 and also a line of subpixels 9 in the TFT layer 3.

The operation of the switchable 2D/3D LCD according to the Embodiment 49 of the present invention will be described. First, lights pass through the layers from backlight 11 until second linear polarizer layer 33 will be the same as in Embodiment 37, and will be omitted. Second, exiting linearly polarized lights from second linearly polarizer 33 will transmit the grid-patterned ¼ wave plate 162 and become left-circularly polarized for left-eye image, and right-circularly polarized for right-eye image, then be perceived by the viewer's left-eye only and right-eye only, respectively, using a pair of analyzer glasses 207 with circular polarizer analyzers. In this Embodiment, the viewer's head can be tilted towards left or right direction without losing the images. Thus the PLNC-2D/3D-LCD in this embodiment has a large viewing angle.

In Embodiment 50, the violet subpixel 24 can be changed to blue subpixel 27, and the tri-primary color mode of the 3D display changes from R+G+V 210 to R+G+B 211.

Embodiment 51 to Embodiment 55

The 2D/3D switchable PLNC-2D/3D-LCDs in Embodiment 51 to Embodiment 55 have similar basic constructions with that of the Embodiment 49 of the present invention. However, they differ in the number of subpixels comprising each pixel. Each pixel has four subpixels, and thus the resulting displays have different 4-primary color modes. Embodiment 51 to Embodiment 55 have 4-primary color modes of R+G+B+V 212, R+G+C+B 213, R+G+C+V 214, R+Y+G+V 215, and R+Y+G+B 216, respectively (FIG. 10).

Embodiment 56 to Embodiment 59

The 2D/3D switchable PLNC-2D/3D-LCD in Embodiment 56 to Embodiment 59 has similar basic constructions with that of the Embodiment 49 of the present invention. However, they differ in the number of subpixels comprising each pixel. Each pixel has five subpixels, and thus the resulting displays have different 5-primary color modes. Embodiment 56 to Embodiment 59 have 5-primary color modes of R+G+C+B+V 217, R+Y+G+C+B 218, R+Y+G+B+V 219, and R+Y+G+C+B 220, respectively (FIG. 10).

Embodiment 60

The 2D/3D switchable PLNC-2D/3D-LCDs in Embodiment 60 has similar basic constructions with that of the Embodiment 49 of the present invention. However, they differ in the number of subpixels comprising each pixel. Each pixel has six subpixels, and thus the resulting display has the 6-primary color modes R+Y+G+C+B+V 221 (FIG. 10).

Embodiment 61 and Embodiment 62

FIG. 24 and FIG. 25 shows the side view and top view, respectively, of the 2D/3D switchable PLNC-2D/3D-LCD in Embodiment 61. FIG. 26 shows the optical and alignment characteristics in the display. It has the basic construction similar to Embodiment 1 of the present invention. The same construction as in Embodiment 1 will be omitted. However, the first linear polarizer layer 31 and second linear polarizer layer 32 in Embodiment 1 are replaced by the first line-patterned linear polarizer layer 35 and the line-patterned linear polarizer layer 36, respectively. Each line-patterned linear polarizer layer has alternatively linear polarizer line 158 with polarization direction of 0° or 45° and linear polarizer line 59 with polarization direction of 90° or 135°. The line-patterned linear polarizer layers 35 and 36 are disposed in a way that each linear polarizer line on one layer can be superimposed on another polarizer line on the other layer, with a 90° difference between their polarization angles, as shown in FIG. 26. Each linear polarizer line 158 or 159 can also superimposed on a line of pixels on the patterned color subpixel layer 22 or the TFT layer 3.

The operation of the switchable 2D/3D LCD according to the Embodiment 61 will be described. Lights from backlight 11 transmit through the first line-patterned linear polarizer layer 35 and become linear polarized patterned as alternative pixel lines with polarization direction of 0° and 90°, or 45° and 135°. Lights are then rotated by the liquid crystal layer 22 and exit from the second line-patterned linear polarizer layer 36 as alternative pixel lines with a polarization direction difference of 90° for neighboring two lines. Using a pair of analyzer glass 200, the left eye can see left-eye image from the left analyzer glass 202 which only let 0° or 45° linearly polarized lights to pass through, the right eye can see right—eye image from the right analyzer glass 201 which only let 90° or 135° linearly polarized lights to pass through. Thus the viewer can perceive the 3D image.

In Embodiment 62, the violet subpixel 24 is changed to blue subpixel 27, and the tri-primary color mode of the 3D display changes from R+G+V 210 to R+G+B 211.

Embodiment 63 to Embodiment 67

The 2D/3D switchable PLNC-2D/3D-LCDs in Embodiment 63 to Embodiment 67 have similar basic constructions with that of the Embodiment 61 of the present invention. However, they differ in the number of subpixels comprising each pixel. Each pixel has four subpixels, and thus the resulting displays have different 4-primary color modes. Embodiment 63 to Embodiment 67 have 4-primary color modes of R+G+B+V 212, R+G+C+B 213, R+G+C+V 214, R+Y+G+V 215, and R+Y+G+B 216, respectively (FIG. 10).

Embodiment 68 to Embodiment 71

The 2D/3D switchable PLNC-2D/3D-LCD in Embodiment 68 to Embodiment 71 has similar basic constructions with that of the Embodiment 61 of the present invention. However, they differ in the number of subpixels comprising each pixel. Each pixel has five subpixels, and thus the resulting displays have different 5-primary color modes. Embodiment 68 to Embodiment 71 have 5-primary color modes of R+G+C+B+V 217, R+Y+G+C+B 218, R+Y+G+B+V 219, and R+Y+G+C+B 220, respectively (FIG. 10).

Embodiment 72

The 2D/3D switchable PLNC-2D/3D-LCDs in Embodiment 72 has similar basic constructions with that of the Embodiment 61 of the present invention. However, they differ in the number of subpixels comprising each pixel. Each pixel has six subpixels, and thus the resulting display has the 6-primary color modes R+Y+G+C+B+V 221 (FIG. 10).

Embodiment 73 and Embodiment 74

FIG. 27 and FIG. 28 shows the side view and top view, respectively, of the 2D/3D switchable PLNC-2D/3D-LCD in Embodiment 73. FIG. 29 shows the optical and alignment characteristics in the display. It has the basic construction similar to Embodiment 1 of the present invention. The same construction as in Embodiment 1 will be omitted. However, the first linear polarizer layer 31 and second linear polarizer layer 32 in Embodiment 1 are replaced by the first grid-patterned linear polarizer layer 37 and the second grid-patterned linear polarizer layer 38, respectively. Each grid-patterned linear polarizer layer has alternatively linear polarizer grids 170 with polarization direction of 0° or 45° and linear polarizer grid 171 with polarization direction of 90° or 135°. The grid-patterned linear polarizer layers 37 and 38 are disposed in a way that each linear polarizer grid on one layer can be superimposed on a polarizer grid on the other layer, with a 90° difference between their polarization angles, as shown in FIG. 29. Each linear polarizer grids 170 or 171 can also superimposed on a pixel of the patterned color subpixel layer 22 or the TFT layer 3.

The operation of the switchable 2D/3D LCD according to the Embodiment 61 will be described. Lights from backlight 11 transmit through the first grid-patterned linear polarizer layer 37 and become linear polarized patterned as alternative pixel grids with polarization direction of 0° and 90°, or 45° and 135°. Lights are then rotated by the liquid crystal layer 22 and exit from the second grid-patterned linear polarizer layer 38 as alternative pixel grids with a polarization direction difference of 90° for neighboring two grids. Using a pair of analyzer glass 200, the left eye can see left-eye image from the left analyzer glass 202 which only let 0° or 45° linearly polarized lights to pass through, the right eye can see right—eye image from the right analyzer glass 201 which only let 90° or 135° linearly polarized lights to pass through. Thus the viewer can perceive the 3D image.

In Embodiment 74, the violet subpixel 24 is changed to blue subpixel 27, and the tri-primary color mode of the 3D display changes from R+G+V 210 to R+G+B 211.

Embodiment 75 to Embodiment 79

The 2D/3D switchable PLNC-2D/3D-LCDs in Embodiment 75 to Embodiment 79 have similar basic constructions with that of the Embodiment 73 of the present invention. However, they differ in the number of subpixels comprising each pixel. Each pixel has four subpixels, and thus the resulting displays have different 4-primary color modes. Embodiment 75 to Embodiment 79 have 4-primary color modes of R+G+B+V 212, R+G+C+B 213, R+G+C+V 214, R+Y+G+V 215, and R+Y+G+B 216, respectively (FIG. 10).

Embodiment 80 to Embodiment 83

The 2D/3D switchable PLNC-2D/3D-LCD in Embodiment 80 to Embodiment 83 has similar basic constructions with that of the Embodiment 73 of the present invention. However, they differ in the number of subpixels comprising each pixel. Each pixel has five subpixels, and thus the resulting displays have different 5-primary color modes. Embodiment 80 to Embodiment 83 have 5-primary color modes of R+G+C+B+V 217, R+Y+G+C+B 218, R+Y+G+B+V 219, and R+Y+G+C+B 220, respectively (FIG. 10).

Embodiment 84

The 2D/3D switchable PLNC-2D/3D-LCD in Embodiment 84 has similar basic constructions with that of the Embodiment 73 of the present invention. However, they differ in the number of subpixels comprising each pixel. Each pixel has six subpixels, and thus the resulting display has the 6-primary color modes R+Y+G+C+B+V 221 (FIG. 10).

Embodiment 85 to Embodiment 108

Embodiment 85 to Embodiment 108 have the similar constructions as Embodiment 61 to Embodiment 84, respectively, but with an additional ¼ phase wave plate 160 disposed direct below the anti-reflection layer 190 and all other below layers. A viewer can wear a pair of analyzer glasses 207 to perceive the 3D image for PLNC-2D/3D-LCDs in these embodiments and the head of the viewer can be tilted while still viewing, the 3D image due to the circularly polarized lights exiting from these displays.

Embodiment 109 and Embodiment 110

FIG. 30 and FIG. 31 show the side view and cross-section view of Embodiment 109. It has the basic construction similar to Embodiment 1. The same construction as in Embodiment 1 will be omitted, a few differences are implemented: the violet PLNCs subpixel 24 changed to a violet subpixel 40 which is transparent or semi-transparent embedded with blue color filter. Violet lights from backlight are taken as violet primary in the display device. Also, in the structure, the second dichroic layer 23 is replaced by a patterned violet-color filter layer 41 which is patterned in a way corresponding to the patterned color subpixel layer 22 that the violet color filter 42 only absorb transmitted violet lights from red PLNCs subpixel 26 and green PLNCs subpixel 25, but sparing the violet subpixel 40, as shown in FIG. 31 and FIG. 32.

The operation of the switchable 2D/3D LCD according to the Embodiment 109 is similar to that in Embodiment 1, and will be omitted. The difference is that the violet primary color is emitted from the backlight in Embodiment 109 instead of from violet PLNCs in Embodiment 1.

In Embodiment 74, the structure is the same as in Embodiment 73, except that blue backlight instead of violet backlight is used, and violet subpixel 40 is changed to blue subpixel 45, and the violet color filter 42 is changed to blue color filter 46, thus the tri-primary color mode of the 3D display changes from R+G+V 210 to R+G+B 211.

As described above, it is possible to implement an LCD structure capable of viewing 2D and 3D images without providing additional parts for 2D and 3D images.

In the optical structure of the present invention, the patterned color subpixel layer 22 below, but not above the liquid crystal layer 32, enabling that visible lights are passing through the liquid crystal layer 32. Also, visible lights exiting from the liquid crystal layer 32 are already polarized. This is in a big difference in contrast to optical structures (U.S. Pat. No. 2009/0230412A1 and U.S. Pat. No. 2009/0091689A1) where the patterned color subpixel layer 22 is disposed above the liquid crystal layer 32 and the color lights are generated in front of the liquid crystal layer 32 resulting to un-polarized emitting lights.

In the optical structure of the present invention, the primary colors are highly saturated, enabling an ultra-wide color gamut for PLNC-2D/3D-LCDs.

In the structure of the present invention, the layer of color filters in conventional LCDs is eliminated. This can improve the light utilization efficiency from 25-30% in this layer to 60-90% for the patterned color subpixel layer 22. This can result to a power reduction of up to 75% from conventional LCDs.

As the present invention may be embodied in several forms without departing from the spirit or essential characteristics thereof, it should also be understood that the as-described examples in above Embodiments 1 to Embodiment 110 are not limited by any of the details of the foregoing description but rather should be construed broadly within its scope as defined in the below claims. Therefore, all changes and modifications that fall within the meets and bounds of the claims, or equivalences of such meets and bounds are therefore intended to be embraced by the below claims.

The invention claimed is:

1. A liquid crystal display device, comprising a photoluminescent layer disposed between a backlight layer and a liquid crystal layer;
    wherein a first linear polarizer layer is disposed between the photoluminescent layer and a first glass layer, the first linear polarizer layer and the photoluminescent layer and the first glass layer are disposed below the liquid crystal layer, the first glass layer is close to the liquid crystal layer relative to the photoluminescent layer;
    wherein a first alignment layer and a first electrode layer and a space layer are disposed below the liquid crystal layer and above the first glass layer, the first alignment layer is disposed between the first electrode layer and the space layer, the space layer is close to the liquid crystal layer relative to the first electrode layer;
    wherein a second space layer and a second electrode layer and a second alignment layer are disposed above the liquid crystal layer, the second alignment layer is disposed between the second space layer and the second electrode layer, the second space layer is close to the liquid crystal layer relative to the second electrode layer;
    wherein a second glass layer is disposed between the second alignment layer and a second polarizer layer, the second electrode layer is close to the liquid crystal layer relative to the second polarizer layer, a anti-reflection layer is disposed a side of the second polarizer layer away from the second glass layer;
    the photoluminescent layer is disposed between a first dichroic layer and a second dichroic layer, the second dichroic layer is disposed close to the liquid crystal layer relative to the first dichroic layer;
    wherein the photoluminescent layer is comprised of patterned photoluminescent nanoparticles (PLNCs), which can absorb lights in an ultraviolet to visible to near-infrared range (250-1400 nm) and emit visible lights in a range of 400-1300 nm.

2. The liquid crystal display device as claimed in claim 1, wherein the photoluminescent layer is composed by PLNCs and can be in the form of a thin solid film, or solid powder, or a patterned solution layer with PLNCs dissolved in liquid solvents, or a patterned sol-gel layer, or a patterned solid film with PLNCs dispersed in a substrate solid layer composed by including but not limited to polymeric films, silica films, glass layer, or other layer structures which can provide a solid support for PLNCs in the structure.

3. The liquid crystal display device as claimed in claim 1, wherein the PLNCs are patterned in a way that two or more kinds of PLNCs are patterned as subpixel grids in the photoluminescent layer;
wherein grids are defined and separated by a separating medium which absorbs or reflect lights in 400-1300 nm;
wherein grids are subpixels which are aligned and can be superimposed with subpixel grids in a first electrode layer, or in a second electrode layer, or in the first polarizer layer, or in the second polarizer layer;
wherein the PLNCs are not mixed randomly in the photoluminescent layer but only one kind of the PLNCs is disposed in one subpixel;
wherein each subpixel can emit only one primary color in a visible range including colors of violet (400-450 nm), blue (450-480 nm), cyan (480-520 nm), green (520-570 nm), yellow (570-590 nm), red (590-700 nm);
where three or more number of PLNCs subpixels can compose a pixel in which three or more numbers of primary colors can be emitted from the pixel when excited by lights from a backlight and an appearance of a mixture of a colors is white;
where a violet PLNCs or a blue PLNCs can be omitted when using violet or blue lights as the backlight layer.

4. The liquid crystal display device as claimed in claim 1, wherein the first polarizer layer and the second polarizer layer can have two or more sub-layers which are uniform in their structure of line-patterned or grid patterned in a way that:
resulting to lights that exiting from the second polarizer layer are color lights in a range 400-1300 nm and also polarized lights with the same polarization direction;
resulting to color lights that exiting from the second polarizer layer are polarized and can be divided into two portions of linearly-polarized lights with a polarization angle difference of 90° within a layer plane for these two portions;
or resulting to color lights in a range of 400-1300 nm that exiting from the second polarizer layer are polarized and can be divided into two portions of left-circularly polarized lights and right-circularly polarized lights.

5. The liquid crystal display device as claimed in claim 1, wherein the LCD device can be used to display 2-dimensional images and videos to a viewer; or display 3-dimensional images and videos to a viewer at the following modes of:
wherein a viewer wears a pair of active shutter liquid crystal glasses;
wherein a viewer wears a pair of passive polarizer glasses with two kinds of linear polarizers in two glasses having the polarization angle different for 90° in the glass plane;
where a viewer wears a pair of color filter glasses with two or one kinds of color filters composed in each glass and different color filters are disposed between the two glasses.

6. The liquid crystal display device as claimed in claim 1, wherein comprising Line-patterned ½ phase retarder layer between the second polarizer layer and the anti-reflection layer.

7. The liquid crystal display device as claimed in claim 6, wherein the line-patterned ½ phase retarder layer is composed by alternative strips of ½ phase retarder and transparent medium, the width of each strip is the same as the height of a subpixel of the patterned color subpixel layer.

8. The liquid crystal display device as claimed in claim 1, wherein a grid-patterned ¼ wave plate is disposed between the second polarizer layer and the anti-reflection layer.

9. The liquid crystal display device as claimed in claim 8, wherein the grid-patterned ¼ wave plate is comprised of alternative ¼ wave plate grids with each grid having the same dimension as a pixel, the two kinds of grids have alternative optical axis of 90° and 180°, or 45° and 135°.

10. The liquid crystal display device as claimed in claim 1, wherein the backlight layer is composed of an array of ultraviolet-emitting semiconductor AlGaN or AlGaInN light emitting diodes (LEDs), violet-emitting GaInN semiconductor LEDs, blue-emitting GaInN semiconductor LEDs, near-infrared LEDs, near-infrared lasers, near-infrared lamps, plasma discharge lamps.

11. The liquid crystal display device as claimed in claim 1, wherein the photoluminescent layer comprising at least three color subpixels.

12. The liquid crystal display device as claimed in claim 1, wherein comprising a patterned ¼ wave plate layer between the second polarizer layer and the anti-reflection layer.

13. A PLNC-2D-LCD/PLNC-3D-LCD, wherein comprising the liquid crystal display device as claimed in claim 1.

14. A PLNC-3D-LCD, wherein comprising the liquid crystal display device as claimed in claim 1.

* * * * *